(12) United States Patent
Lewis

(10) Patent No.: US 11,537,815 B2
(45) Date of Patent: Dec. 27, 2022

(54) METHODS AND SYSTEMS THAT USE INCOMPLETE TRAINING DATA TO TRAIN MACHINE-LEARNING BASED SYSTEMS

(71) Applicant: Symbolcraft LLC, Seattle, WA (US)

(72) Inventor: Paton J. Lewis, Seattle, WA (US)

(73) Assignee: Symbolcraft LLC, Seattle, WA (US)

( * ) Notice: Subject to any disclaimer, the term of this patent is extended or adjusted under 35 U.S.C. 154(b) by 1051 days.

(21) Appl. No.: 16/216,854

(22) Filed: Dec. 11, 2018

(65) Prior Publication Data

US 2020/0184268 A1 Jun. 11, 2020

(51) Int. Cl.
*G06K 9/62* (2022.01)
*G06N 20/00* (2019.01)
*G06N 3/08* (2006.01)
*G06V 10/98* (2022.01)

(52) U.S. Cl.
CPC ......... *G06K 9/6257* (2013.01); *G06K 9/6215* (2013.01); *G06N 3/084* (2013.01); *G06N 20/00* (2019.01); *G06V 10/98* (2022.01)

(58) Field of Classification Search
CPC .. G06K 9/6257; G06K 9/6215; G06K 9/6259; G06K 9/6267; G06K 9/03; G06N 3/084; G06N 3/0445; G06N 3/0481; G06N 20/00; G06V 10/82; G06V 10/98
See application file for complete search history.

(56) References Cited

U.S. PATENT DOCUMENTS

| | | | |
|---|---|---|---|
| 10,474,713 B1* | 11/2019 | Kim | G06T 7/11 |
| 10,963,754 B1* | 3/2021 | Ravichandran | G06K 9/6277 |
| 2019/0087673 A1* | 3/2019 | Li | G06K 9/6265 |
| 2020/0074280 A1* | 3/2020 | Meier | G06V 10/82 |
| 2021/0327127 A1* | 10/2021 | Hinterstoisser | G06T 3/40 |

* cited by examiner

*Primary Examiner* — Carol Wang
(74) *Attorney, Agent, or Firm* — Olympic Patent Works PLLC

(57) ABSTRACT

The current document is directed to methods and systems that effectively and efficiently employ incomplete training data to train machine-learning-based systems. Incomplete training data, as one example, may include training data with erroneous or inaccurate input-vector/label pairs. In currently disclosed methods and systems, Incomplete training data is mapped to loss classes based on addition training-data information and specific, different additional-information-dependent loss-generation methods are employed for training data of different loss classes during machine-learning-based-system training so that incomplete training data can be effectively and efficiently used.

20 Claims, 41 Drawing Sheets

```
typedef vector<node> Layer;
typedef double(*ActivationFunction)(double x);   ⎫
class node;                                      ⎬ 802
typedef node* NodePtr;                           ⎭ class node
{
    private:        ⎯ 806
        double output;        ⎯ 807
        ActivationFunction g;
        vector<double> weights;   ⎯ 808
        vector<NodePtr> inputs;   ⎯ 809   ⎬ 804
    public:
        void activate();   ⎯ 810
        void setOutput(double out){output = out;}  ⎫
        double getOutput() { return output;};      ⎬ 812
};

class neuralNet
{
    private:        ⎯ 816
        int numLayers;
        vector<Layer> layers;   ⎯ 818   ⎬ 814
    public:
        void f(vector<double> x, vector<double>& y);
};
                            ⎯ 820 void node::activate()
{
    int j;
    double sum = weights[0] * -1;
                                                        ⎬ 822
    for (j = 0; j < inputs.getDimension(); j++)
        sum += inputs[j]->getOutput() * weights[j+1];
    output = g(sum);
} void neuralNet::f(vector<double> x, vector<double>& y)
{
    int i, j;
                                                                    ⎯ 826
    for (j = 0; j < layers[0].getDimension(); j++) layers[0][j].setOutput(x[j]);

for (i = 1; i < numLayers; i++)                    ⎫
        for (j = 0; j < layers[i].getDimension(); j++) ⎬ 827     ⎬ 824
            layers[0][j].activate();                   ⎭
                                                    ⎯ 828
    for (j = 0; j < layers[numLayers - 1].getDimension(); j++)
        y[j] = layers[numLayers - 1][j].getOutput();
}
```

FIG. 8

$$E = \frac{1}{2}\Big(\text{length}\big(y - \hat{f}(x)\big)\Big)^2$$

$$= \frac{1}{2}\big(y - \hat{f}(x)\big) \cdot \big(y - \hat{f}(x)\big)$$

$$= \frac{1}{2}\sum_i \big(y_i - \hat{f}(x)_i\big)^2$$

$$= \frac{1}{2}\sum_i (y_i - a_i)^2, \text{where } i \in \text{output nodes}$$

$$\Bigg\} 1002$$

$$\frac{\partial E}{\partial w_{i,j}} = \frac{\partial}{\partial w_{i,j}}\bigg(\frac{1}{2}\sum_k (y_k - a_k)^2\bigg), \text{where } k \in \text{output nodes}$$

$$= -(y_i - a_i)\frac{\partial a_i}{\partial w_{i,j}}$$

$$= -\bigg(y_i - g\bigg(\sum_j a_j w_{i,j}\bigg)\bigg)\frac{\partial}{\partial w_{i,j}}g\bigg(\sum_j a_j w_{i,j}\bigg)$$

$$= -\bigg(y_i - g\bigg(\sum_j a_j w_{i,j}\bigg)\bigg)g'\bigg(\sum_j a_j w_{i,j}\bigg)\frac{\partial}{\partial w_{i,j}}\bigg(\sum_j a_j w_{i,j}\bigg)$$

$$= -\bigg(y_i - g\bigg(\sum_j a_j w_{i,j}\bigg)\bigg)g'\bigg(\sum_j a_j w_{i,j}\bigg)a_j$$

$$\Bigg\} 1004$$

$$g(x) = \frac{1}{1 + e^{-x}}$$

$$\frac{d}{dx}g(x) = -(1 + e^{-x})^{-2}(-e^{-x})$$

$$= \frac{e^{-x}}{(1 + e^{-x})^2} = \frac{1 + e^{-x} - 1}{(1 + e^{-x})^2} = \frac{1}{1 + e^{-x}} - \frac{1}{(1 + e^{-x})^2}$$

$$= \bigg(\frac{1}{1 + e^{-x}}\bigg)\bigg(1 - \frac{1}{1 + e^{-x}}\bigg)$$

$$= g(x)(1 - g(x))$$

$$\Bigg\} 1006$$

$$\frac{\partial E}{\partial w_{i,j}} = -(y_i - a_i)(a_i(1 - a_i))a_j$$

$$= -a_j \Delta_i$$

$$\Big\} 1008$$

$$w_{i,j} = w_{i,j} + r(a_j \Delta_i) \;\; \leftarrow 1010$$

FIG. 10A $$\frac{\partial E}{\partial w_{j,k}} = -\sum_i (y_i - a_i) \frac{\partial a_i}{\partial w_{j,k}}$$

$$= -\sum_i (y_i - a_i) \frac{\partial}{\partial w_{j,k}} g\left(\sum_j a_j w_{i,j}\right)$$

$$= -\sum_i (y_i - a_i) g'\left(\sum_j a_j w_{i,j}\right) \frac{\partial}{\partial w_{j,k}} \left(\sum_j a_j w_{i,j}\right)$$

$$= -\sum_i (y_i - a_i)\left(a_i(1-a_i)\right) w_{i,j} \frac{\partial a_j}{\partial w_{j,k}}$$

$$= -\sum_i \Delta_i\, w_{i,j} \frac{\partial a_j}{\partial w_{j,k}}$$

$$= -\sum_i \Delta_i\, w_{i,j} \frac{\partial}{\partial w_{j,k}} g\left(\sum_k a_k w_{j,k}\right)$$

$$= -\sum_i \Delta_i\, w_{i,j}\, g'\left(\sum_k a_k w_{j,k}\right) \frac{\partial}{\partial w_{j,k}} \left(\sum_k a_k w_{j,k}\right)$$

$$= -\sum_i \Delta_i\, w_{i,j}\, g'\left(\sum_k a_k w_{j,k}\right) a_k$$

$$= -\sum_i \Delta_i\, w_{i,j}\left(a_j(1-a_j)\right) a_k$$

$$= -\sum_i \Delta_i\, w_{i,j} \Delta_j a_k$$

$$= -a_k \Delta_{i,j}$$

$$w_{j,k} = w_{j,k} + r(a_k \Delta_{i,j})$$

FIG. 10B

Y* < Y $$\text{boundary\_loss } (y, \hat{y}, p) = |z|^2 (\cos(\arg(z))+1)$$
where  $z = e^{pi\pi} (qy-\hat{y})$,
  $q = 1-k+2k(p-1)$,
  $p \in \mathbb{R}, 1 \leq p \leq 2$, and
  $k \in \mathbb{R}, 0 \leq k \leq 1$
} 1802

$y^* \ll y$   $p=1$
$y^* < y$   $p=5/4$
$y^* \approx y$   $p=1.5$   } 1804
$y^* > y$   $p=7/4$
$y^* \gg y$   $p=2$

FIG. 18 p = 1, k = 0 p = 1.1, k = 0 p = 1.2, k = 0 p = 1.3, k = 0 p = 1.4, k = 0 p = 1.5, k = 0

METHODS AND SYSTEMS THAT USE INCOMPLETE TRAINING DATA TO TRAIN MACHINE-LEARNING BASED SYSTEMS

TECHNICAL FIELD

The current document is directed to machine learning and artificial intelligence and, in particular, to methods and systems that efficiently use incomplete training data during training of machine-learning-based systems, including machine-learning-based recognition and classification systems.

BACKGROUND

The fields of machine learning and artificial intelligence emerged soon after the development of electronic computing systems and have been fertile areas of research for mathematicians and computer scientists during the past half-century. While initial machine-learning-based systems were severely constrained by the relatively low computational bandwidths and memory capacities of early computing systems as well as by primitive early technologies, machine-learning-based systems have exploded in capability and utility during the past 10 years. Machine-learning-based systems are now routinely exploited in commercial applications that include a wide variety of different types of recognition, characterization, and classification systems, including: natural-language systems used for speech recognition, language translation; systems used to convert images of handwriting or printed text to electronic documents; image-recognition systems, including automated systems for reading license plates, identifying human beings from facial images, and automated attribute assignment to images; and a wide variety of different types of systems that control other systems, analyze complex phenomena and events, and predict future behavior of complex systems, including various types of market-analysis and market-prediction systems, aircraft-controlled systems, and other types of control and analysis systems.

As machine-learning-based systems have become integrated in industry and commerce, and as the complexity and computational-bandwidth requirements of these systems have steadily increased, efficient and effective training of machine-learning-based systems has emerged as an important and increasingly relevant problem domain. In many cases, efficient and effective training of machine-learning-based systems may constitute the single most important and rate-limiting step in developing machine-learning-based systems dedicated to specific tasks and operations. Often, it is assumed that balanced and relatively complete training data will be available to train machine-learning-based systems to correctly and reliably carry out the tasks and operations to which they are applied, but it is becoming increasingly clear that these assumptions are often unjustified. In particular, in real-world applications, the training data may include erroneous or inaccurate input-vector/label pairs and may therefore be unbalanced and incomplete, as a result of which the accuracy and reliability of machine-learning-based systems trained using incomplete training data may fall below acceptable levels. Those who develop, sell, and use machine-learning-based systems have become increasingly aware of problems associated with erroneous, unbalanced, and incomplete training data.

SUMMARY

The current document is directed to methods and systems that effectively and efficiently employ incomplete training data to train machine-learning-based systems. Incomplete training data, as one example, may include training data with erroneous or inaccurate input-vector/label pairs. In currently disclosed methods and systems, Incomplete training data is mapped to into loss classes based on addition training-data information and specific, different additional-information-dependent loss-generation methods are employed for training data of different loss classes during machine-learning-based-system training so that incomplete training data can be effectively and efficiently used.

BRIEF DESCRIPTION OF THE DRAWINGS

FIG. 8 provides a concise pseudocode illustration of the implementation of a simple feed-forward neural network.

FIGS. 10A-B show the details of the weight-adjustment calculations carried out during back propagation.

FIG. 18 illustrates one parametric loss function that can be employed by the currently disclosed methods and systems to generate loss-class-specific loss values for training-dataset input-vector/label pairs with suspect labels.

DETAILED DESCRIPTION

Figure 1:
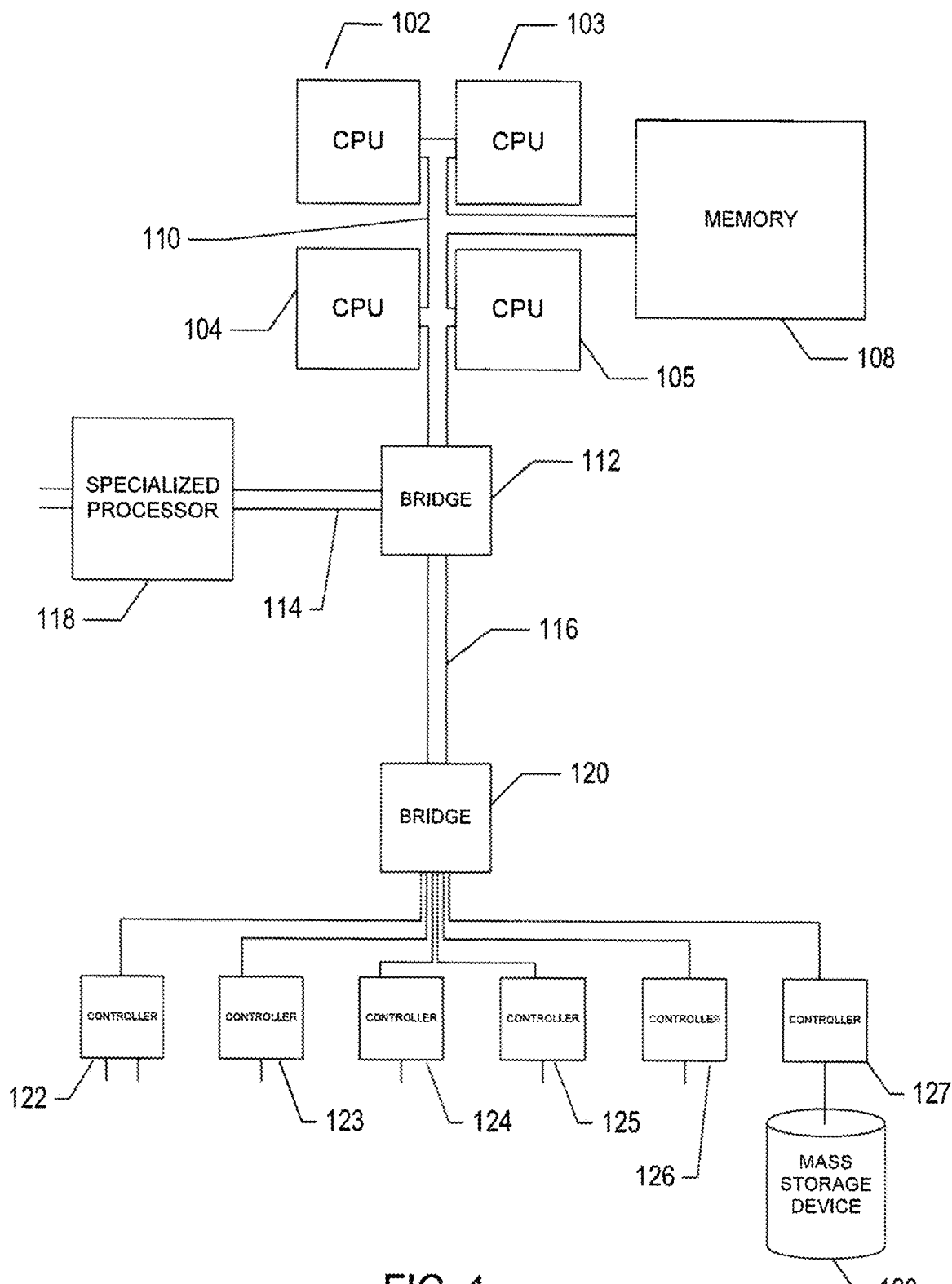
FIG. 1 provides a general architectural diagram for various types of computers.

The current document is directed to methods and systems that effectively and efficiently employ incomplete training data to train machine-learning-based systems. A first sub-section discusses computer hardware, computer systems, and other aspects of the electromechanical machinery controlled by machine-learning-based and artificial-intelligence-based control subsystems to produce the machine-learning-based systems that are trained to carry out a variety of complex recognition, characterization, classification, and analysis tasks, both as standalone machine-learning-based systems and as subsystems within larger systems devoted to various types of high-level tasks, such as recognizing individual human beings and surveillance photos, identifying license plates in cameras at automated toll stations in order to generate electronic billings for bridge and tollway transit, and many other such high-level tasks. In a following subsection, the currently disclosed methods and systems are discussed, in detail.

Computer Hardware, Complex Computational Systems, and Virtualization

The terms "virtual" and "abstraction" are not, in any way, intended to mean or suggest an abstract idea or concept or some type of disembodied theory or design. Computational abstractions are tangible, physical interfaces that are implemented, ultimately, using physical computer hardware, data-storage devices, and communications systems. Virtual machines and other virtual resources are implemented in physical resources and generally include one or more additional layers of abstraction in addition to the physical resources. The term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such assertions are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine.

FIG. 1 provides a general architectural diagram for various types of computers. Computers that implement all or a portion of a machine-learning-based system may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. Such distributed computing systems provide diverse arrays of functionalities. For example, a PC or smart-phone user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 2:
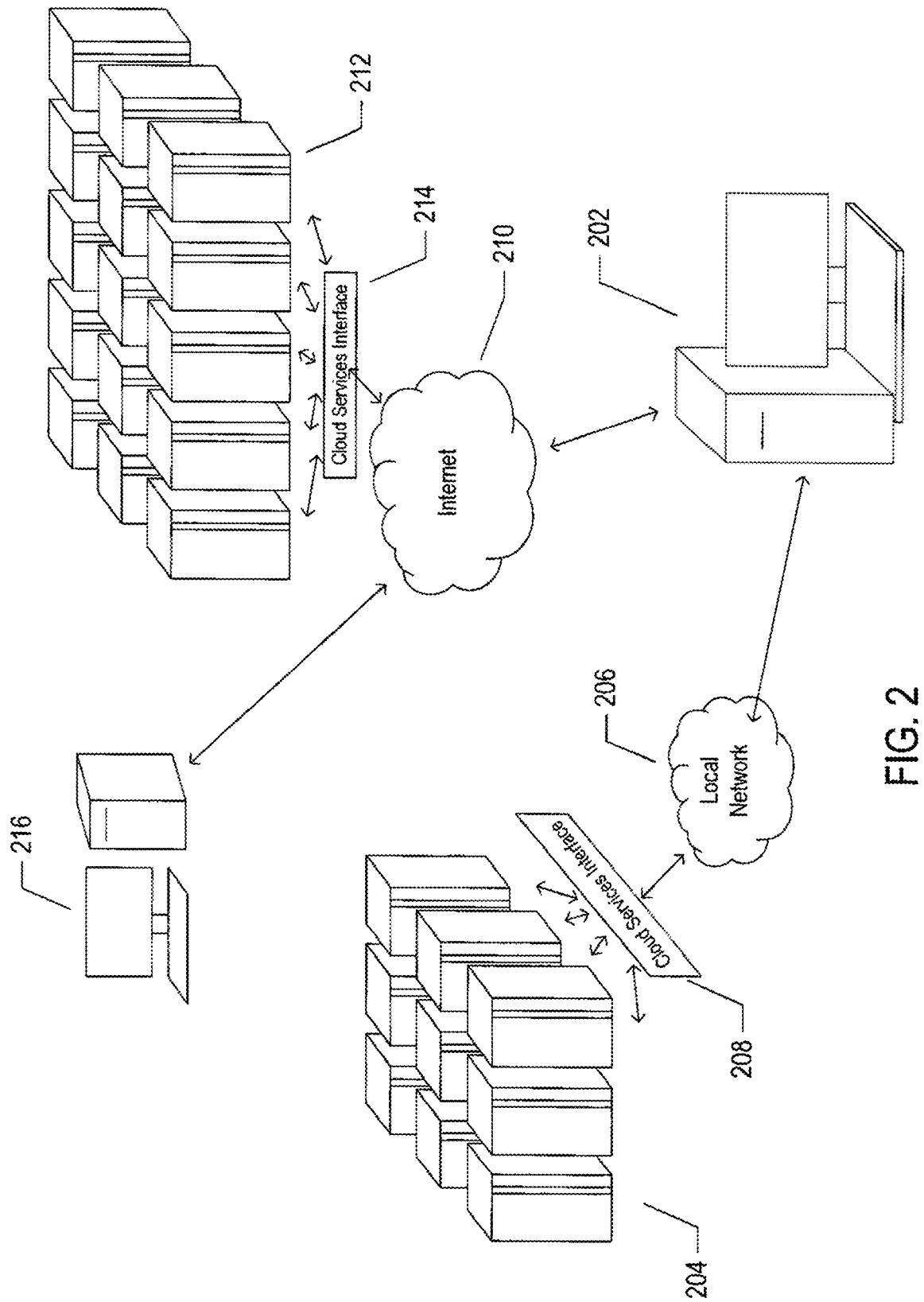
FIG. 2 illustrates cloud computing.

FIG. 2 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 2, a system administrator for an organization, using a PC 202, accesses the organization's private cloud 204 through a local network 206 and private-cloud interface 208 and also accesses, through the Internet 210, a public cloud 212 through a public-cloud services interface 214. The administrator can, in either the case of the private cloud 204 or public cloud 212, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 216.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 3:
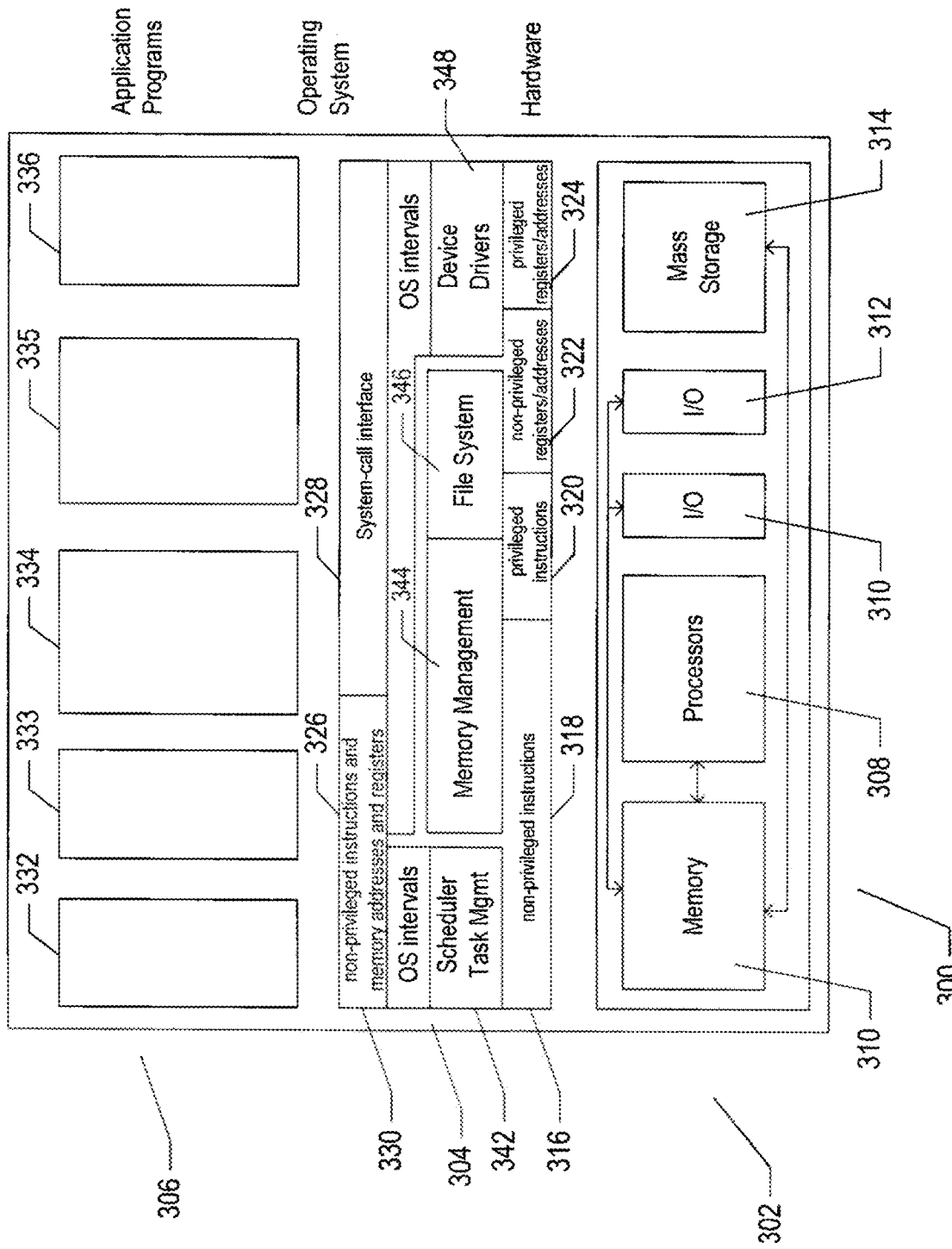
FIG. 3 illustrates generalized hardware and software components of a general-purpose computer system, such as a general-purpose computer system having an architecture similar to that shown in FIG. 1.

FIG. 3 illustrates generalized hardware and software components of a general-purpose computer system, such as a general-purpose computer system having an architecture similar to that shown in FIG. 1, including servers used in cloud-computing facilities. The computer system 300 is often considered to include three fundamental layers: (1) a hardware layer or level 302; (2) an operating-system layer or level 304; and (3) an application-program layer or level 306. The hardware layer 302 includes one or more processors 308, system memory 310, various different types of input-output ("I/O") devices 310 and 312, and mass-storage devices 314. Of course, the hardware level also includes many other components, including power supplies, internal communications links and busses, specialized integrated circuits, many different types of processor-controlled or microprocessor-controlled peripheral devices and controllers, and many other components. The operating system 304 interfaces to the hardware level 302 through a low-level operating system and hardware interface 316 generally comprising a set of non-privileged computer instructions 318, a set of privileged computer instructions 320, a set of non-privileged registers and memory addresses 322, and a set of privileged registers and memory addresses 324. In general, the operating system exposes non-privileged instructions, non-privileged registers, and non-privileged memory addresses 326 and a system-call interface 328 as an operating-system interface 330 to application programs 332-336 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 342, memory management 344, a file system 346, device drivers 348, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 336 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 4:
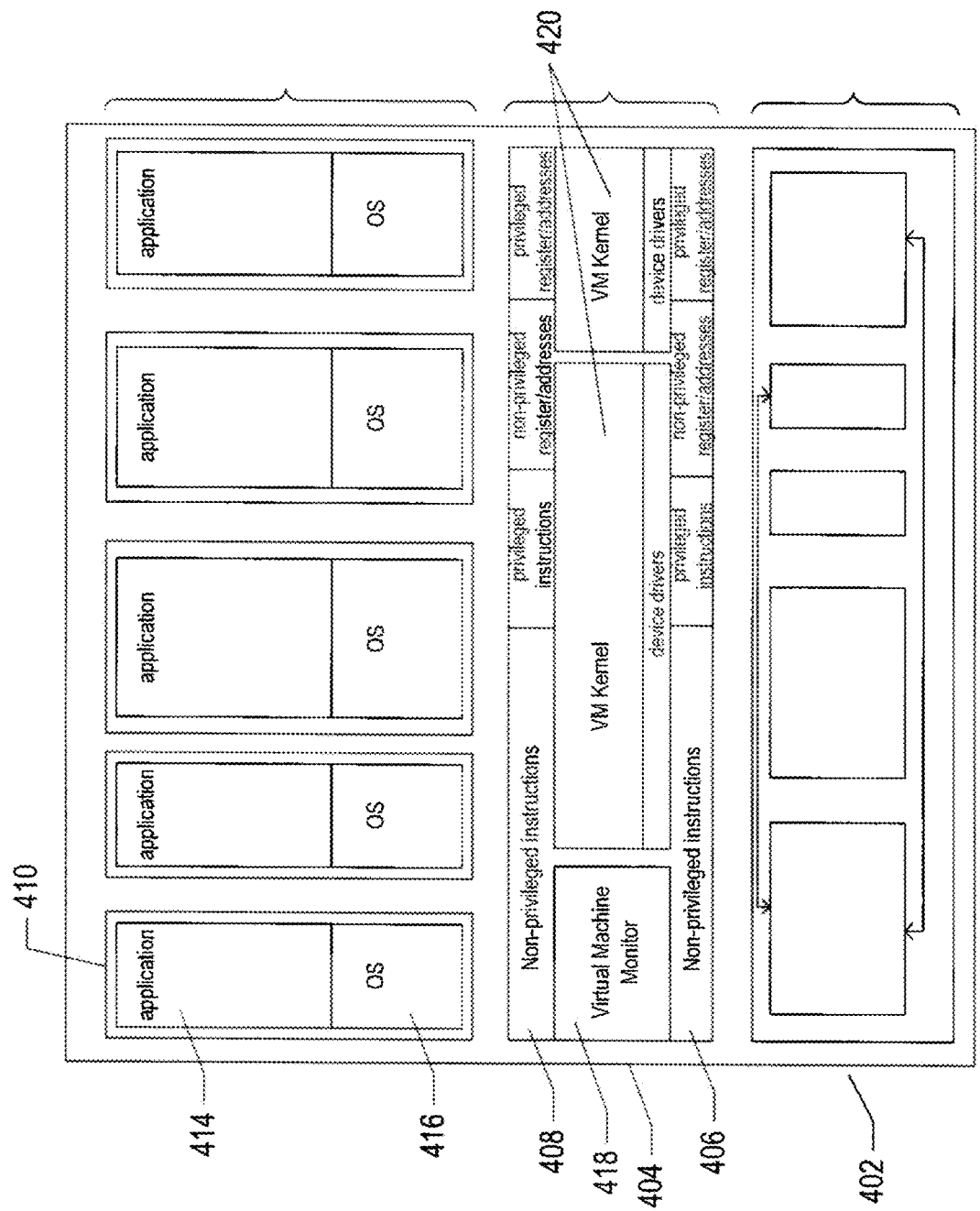
FIG. 4 illustrates one type of virtual machine and virtual-machine execution environment.

For all of these reasons, a higher level of abstraction, referred to as the "virtual machine," has been developed and evolved to further abstract computer hardware in order to address many difficulties and challenges associated with traditional computing systems, including the compatibility issues discussed above. FIG. 4 illustrates one type of virtual machine and virtual-machine execution environment. FIG. 4 uses the same illustration conventions as used in FIG. 3. FIG. 4 shows a first type of virtualization. The computer system 400 in FIG. 4A includes the same hardware layer 402 as the hardware layer 302 shown in FIG. 3. However, rather than providing an operating system layer directly above the hardware layer, as in FIG. 3, the virtualized computing environment illustrated in FIG. 4A features a virtualization layer 404 that interfaces through a virtualization-layer/hardware-layer interface 406, equivalent to interface 316 in FIG. 3, to the hardware. The virtualization layer provides a hardware-like interface 408 to a number of virtual machines, such as virtual machine 410, executing above the virtualization layer in a virtual-machine layer 412. Each virtual machine includes one or more application programs or other higher-level computational entities packaged together with an operating system, referred to as a "guest operating system," such as application 414 and guest operating system 416 packaged together within virtual machine 410. Each virtual machine is thus equivalent to the operating-system layer 304 and application-program layer 306 in the general-purpose computer system shown in FIG. 3. Each guest operating system within a virtual machine interfaces to the virtualization-layer interface 408 rather than to the actual hardware interface 406. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 408 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 418 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 408, the accesses result in execution of virtualization-layer code to simulate or emulate the privileged resources. The virtualization layer additionally includes a kernel module 420 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Currently Disclosed Methods and Systems

Figure 5:
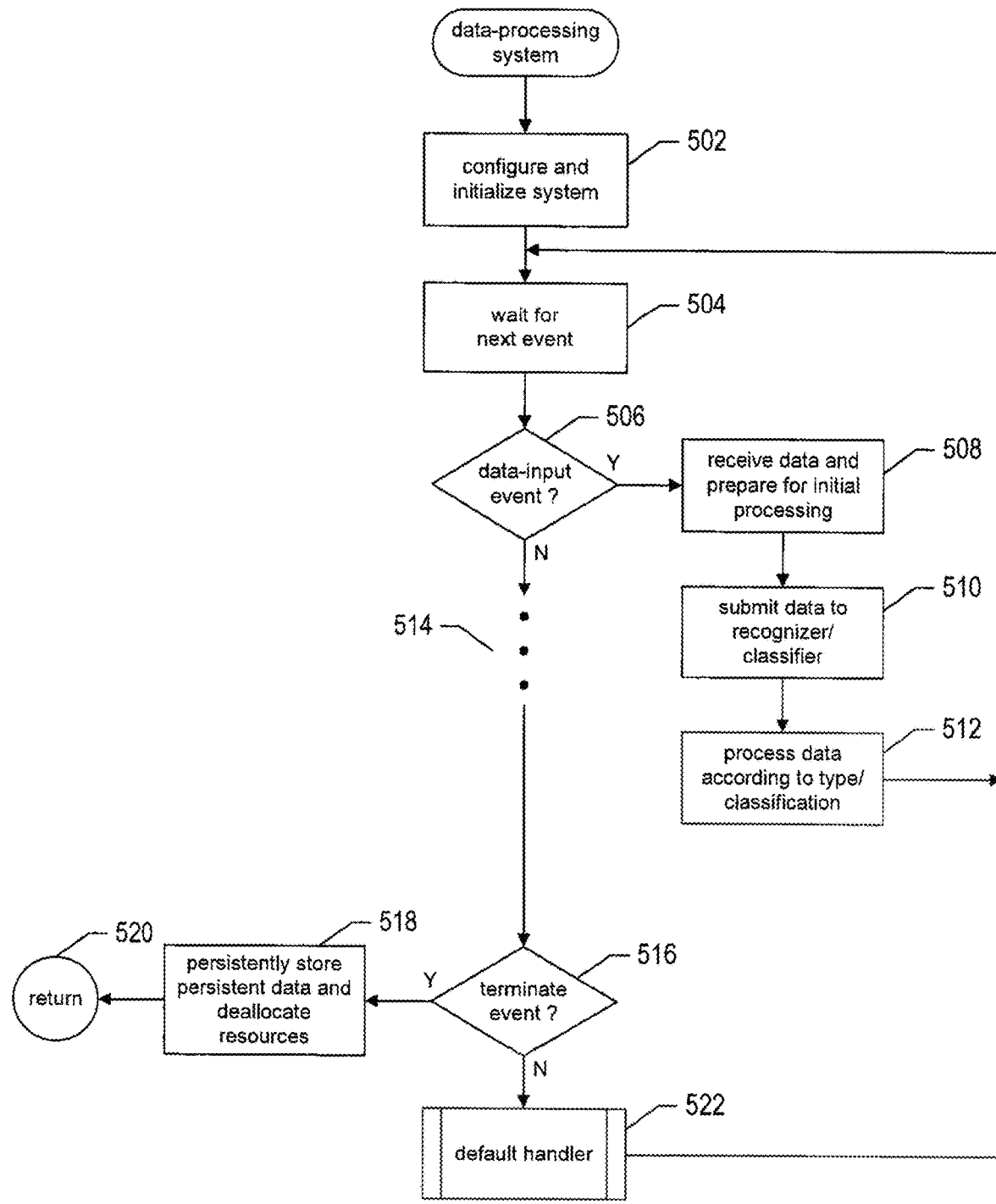
FIG. 5 provides a control-flow-diagram illustration of how machine-learning-based subsystems may be incorporated into various types of systems.

There are hundreds, thousands, or more different types of systems that employ machine-learning-based subsystems to carry out various types of complex tasks, such as recognizing individuals in digital images, transforming images of handwriting or text into electronic documents, translating texts in one natural language to another, assigning attributes to images, text passages, and other encoded information, and many other such tasks. FIG. 5 provides a control-flow-diagram illustration of how machine-learning-based subsystems may be incorporated into various types of systems. The control-flow diagram illustrates an event loop on which implementation of a data-processing system is based. In step 502, the data-processing system is configured and initialized. Then, in step 504, the data-processing system waits for the occurrence of a next event. When the next-occurring event is a data-input event, as detected in step 506, the input data is received and prepared for initial processing, in step 508, after which the initially processed data is submitted to a machine-learning-based recognizer or classifier, in step 510, to recognize, classify, type, assign attributes to, or otherwise categorize the received data. In step 512, the data-processing system then processes the data according to the type, classification, attributes, or other result produced by the machine-learning-based recognizer or classifier in step 510. Ellipsis 514 indicates that many other types of events may be handled by the data-processing system. When the next occurring event is a termination event, as determined in step 1516, any information that needs to be persistently stored is stored in one or more data-storage devices and any allocated resources are deallocated, in step 1518, before the data-processing system halts operation, in step 520. A default handler 522 may handle any rare or unexpected events. Following handling of events other than termination events, control returns to step 504, where the data-processing system waits for a next event to occur. Of course, any particular data-processing system includes additional logic and a great many additional details, operations, and functionalities. In some cases, the data-processing system may be employed specifically to recognize, classify, type, assign attributes to, or otherwise categorize input data, and may thus largely consist of a machine-learning-based recognizer or classifier. In general, however, such machine-learning-based recognizers or classifiers are employed, as shown in FIG. 5, as one component of a larger system. As one example, the data-processing system may be a complex traffic-monitoring system installed at the entrance to a highway bridge, which continuously monitors, via digital cameras, the license plates of vehicles passing over the highway bridge in order to automatically bill the drivers of the vehicles for an appropriate bridge-transit toll. The data-input events for such a system generally include still images or video frames. The initial processing of such still images or video frames may involve cropping and scaling the images so that relatively uniformly sized rectangular sub-images corresponding to license plates can be extracted from the images. The extracted subimages may then be input to a trained neural network which returns a digital encoding of the alphanumeric license-plate number. The digitally encoded license-plate number is then processed by accessing a database of license-plate numbers to obtain an address for the owner of the vehicle and by then initiating a billing communication.

There are many different types of machine-learning-based subsystems that can be used for various types of recognition, classification, typing, analysis, and other complex tasks carried out on various types of input data that require training, using training datasets, in order to accurately carry out the complex tasks. One type of machine-learning-based subsystem that is frequently used in such applications is referred to as a "neural network." There are many different types of neural networks. In the following paragraphs, an overview is provided of several different types of neural networks in order to provide a conceptual basis for subsequently explaining the currently disclosed methods and systems.

Figure 6:
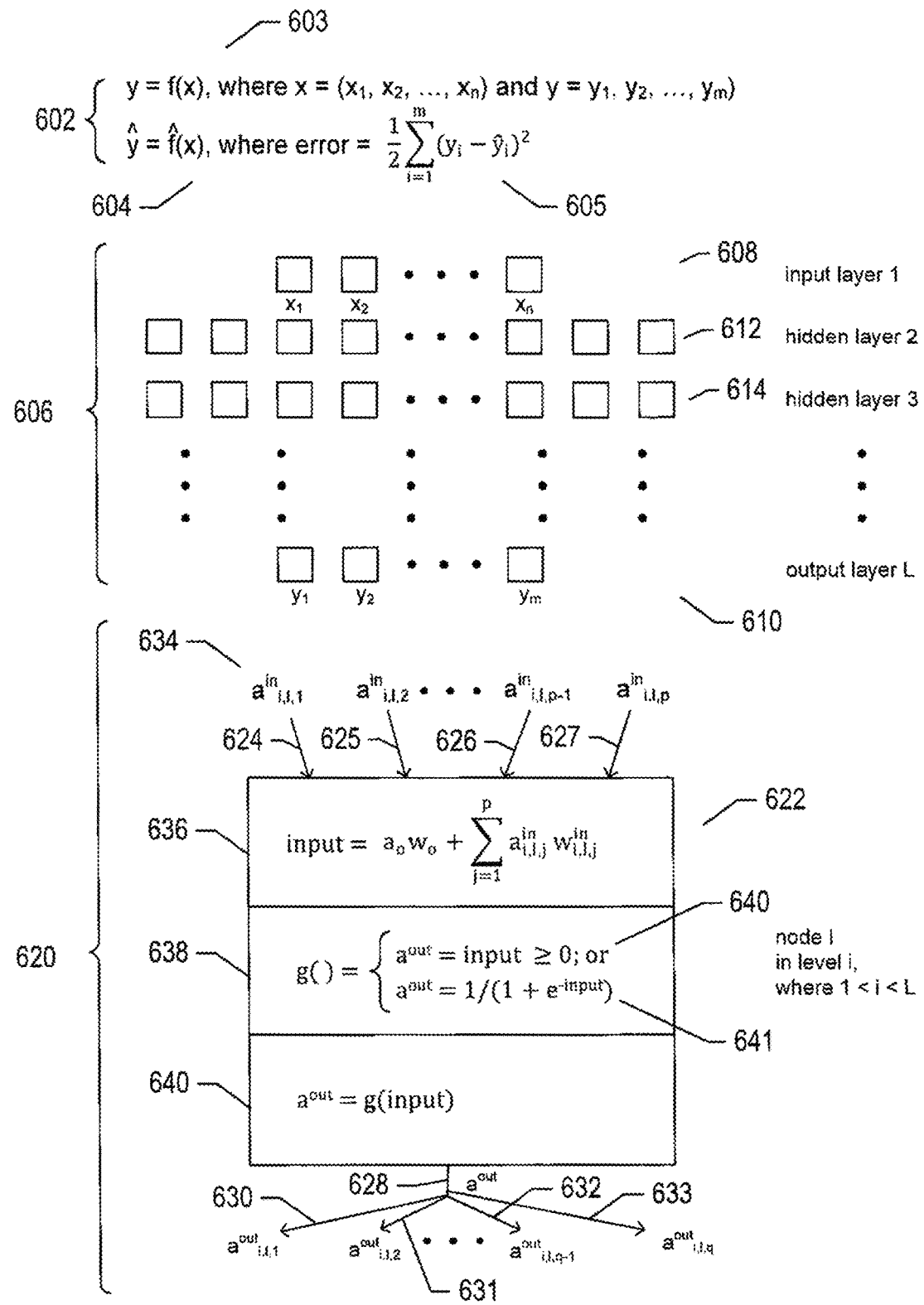
FIG. 6 illustrates the fundamental components of a feed-forward neural network.

FIG. 6 illustrates the fundamental components of a feed-forward neural network. Equations 602 mathematically represents ideal operation of a neural network as a function $f(x)$. The function receives an input vector x and outputs a corresponding output vector y 603. For example, an input vector may be a digital image represented by a two-dimensional array of pixel values in an electronic document or may be an ordered set of numeric or alphanumeric values. Similarly, the output vector may be, for example, an altered digital image, an ordered set of one or more numeric or alphanumeric values, an electronic document, one or more numeric values. The initial expression 603 represents the ideal operation of the neural network. In other words, the output vectors y represent the ideal, or desired, output for corresponding input vector x. However, in actual operation, a physically implemented neural network $\hat{f}(x)$, as represented by expressions 604, returns a physically generated output vector j that may differ from the ideal or desired output vector y. As shown in the second expression 605 within expressions 604, an output vector produced by the physically implemented neural network is associated with an error or loss value. A common error or loss value is the square of the distance between the two points represented by the ideal output vector and the output vector produced by the neural network. To simplify back-propagation computations, discussed below, the square of the distance is often divided by 2. As further discussed below, the distance between the two points represented by the ideal output vector and the output vector produced by the neural network, with optional scaling, may also be used as the error or loss. A neural network is trained using a training dataset comprising input-vector/ideal-output-vector pairs, generally obtained by human or human-assisted assignment of ideal-output vectors to selected input vectors. The ideal-output vectors in the training dataset are often referred to as "labels." During training, the error associated with each output vector, produced by the neural network in response to input to the neural network of a training-dataset input vector, is used to adjust internal weights within the neural network in order to minimize the error or loss. Thus, the accuracy and reliability of a trained neural network is highly dependent on the accuracy and completeness of the training dataset.

As shown in the middle portion 606 of FIG. 6, a feed-forward neural network generally consists of layers of nodes, including an input layer 608, and output layer 610, and one or more hidden layers 612 and 614. These layers can be numerically labeled 1, 2, 3, . . . , L, as shown in FIG. 6. In general, the input layer contains a node for each element of the input vector and the output layer contains one node for each element of the output vector. The input layer and/or output layer may have one or more nodes. In the following discussion, the nodes of a first level with a numeric label lower in value than that of a second layer are referred to as being higher-level nodes with respect to the nodes of the second layer. The input-layer nodes are thus the highest-level nodes. The nodes are interconnected to form a graph.

The lower portion of FIG. 6 (620 in FIG. 6) illustrates a feed-forward neural-network node. The neural-network node 622 receives inputs 624-627 from one or more next-higher-level nodes and generates an output 628 that is distributed to one or more next-lower-level nodes 630-633. The inputs and outputs are referred to as "activations," represented by superscripted-and-subscripted symbols "a" in FIG. 6, such as the activation symbol 634. An input component 636 within a node collects the input activations and generates a weighted sum of these input activations to which a weighted internal activation $a_0$ is added. An activation component 638 within the node is represented by a function g( ), referred to as an "activation function," that is used in an output component 640 of the node to generate the output activation of the node based on the input collected by the input component 636. The neural-network node 622 represents a generic hidden-layer node. Input-layer nodes lack the input component 636 and each receive a single input value representing an element of an input vector. Output-component nodes output a single value representing an element of the output vector. The values of the weights used to generate the cumulative input by the input component 636 are determined by training, as previously mentioned. In general, the input, outputs, and activation function are predetermined and constant, although, in certain types of neural networks, these may also be at least partly adjustable parameters. In FIG. 6, two different possible activation functions are indicated by expressions 640 and 641. The latter expression represents a sigmoidal relationship between input and output that is commonly used in neural networks and other types of machine-learning systems.

Figure 7:
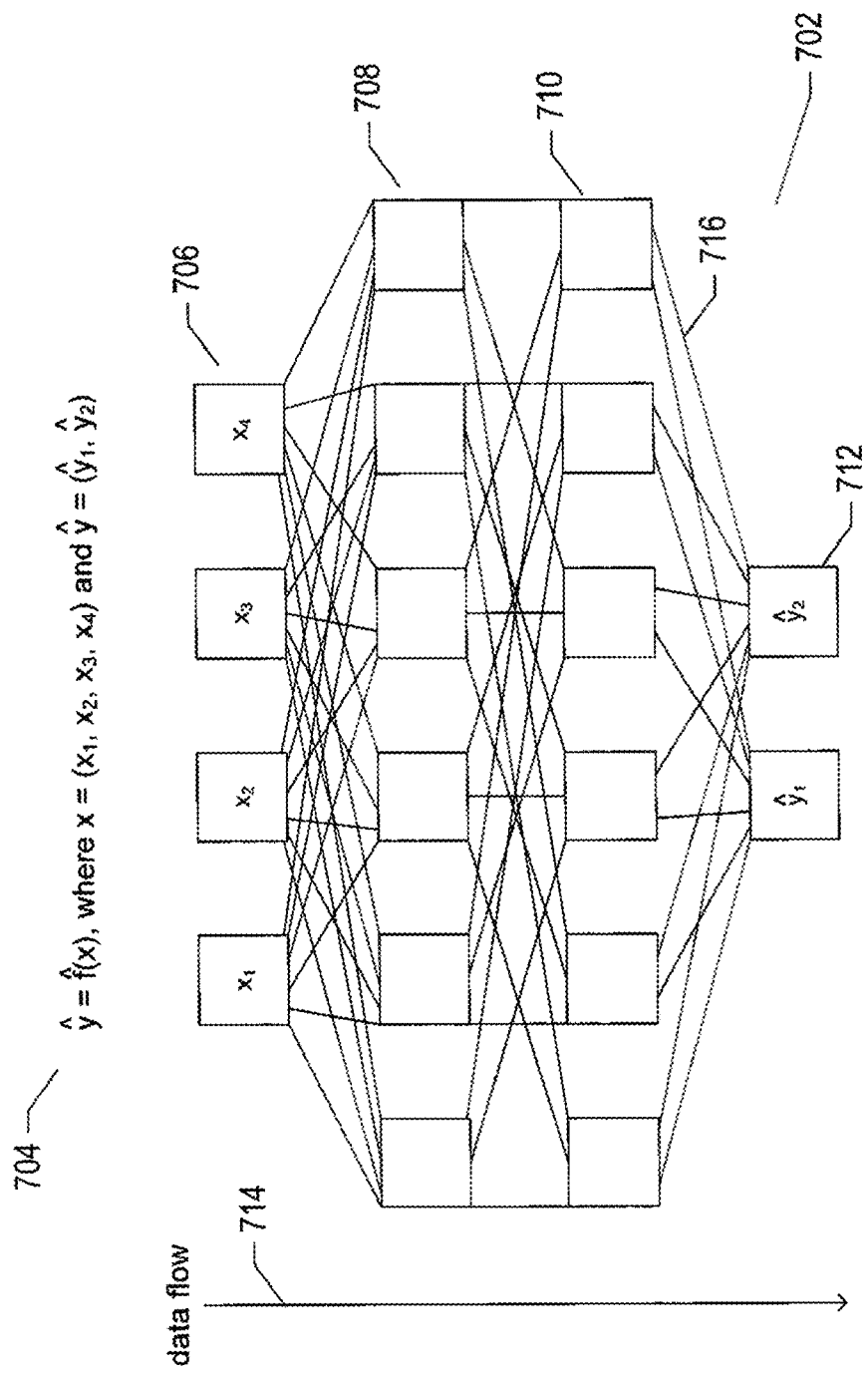
FIG. 7 illustrates a small, example feed-forward neural network.

FIG. 7 illustrates a small, example feed-forward neural network. The example neural network 702 is mathematically represented by expression 704. It includes an input layer of four nodes 706, a first hidden layer 708 of six nodes, a second hidden layer 710 of six nodes, and an output layer 712 of two nodes. As indicated by directed arrow 714, data input to the input-layer nodes 706 flows downward through the neural network to produce the final values output by the output nodes in the output layer 712. The line segments, such as line segment 716, interconnecting the nodes in the neural network 702 indicate communications paths along which activations are transmitted from higher-level nodes to lower-level nodes. In the example feed-forward neural network, the nodes of the input layer 706 are fully connected to the nodes of the first hidden layer 708, but the nodes of the first hidden layer 708 are only sparsely connected with the nodes of the second hidden layer 710. Various different types of neural networks may use different numbers of layers, different numbers of nodes in each of the layers, and different patterns of connections between the nodes of each layer to the nodes in preceding and succeeding layers.

FIG. 8 provides a concise pseudocode illustration of the implementation of a simple feed-forward neural network. Three initial type definitions 802 provide types for layers of nodes, pointers to activation functions, and pointers to nodes. The class node 804 represents a neural-network node. Each node includes the following data members: (1) output 806, the output activation value for the node; (2) g 807, a pointer to the activation function for the node; (3) weights 808, the weights associated with the inputs; and (4) inputs 809, pointers to the higher-level nodes from which the node receives activations. Each node provides an activate member function 810 that generates the activation for the node, which is stored in the data member output, and a pair of member functions 812 for setting and getting the value stored in the data member output. The class neuralNet 814 represents an entire neural network. The neural network includes data members that store the number of layers 816 and a vector of node-vector layers 818, each node-vector layer representing a layer of nodes within the neural network. The single member function $f$ 820 of the class neuralNet generates an output vector y for an input vector x. An implementation of the member function activate for the node class is next provided 822. This corresponds to the expression shown for the input component 636 in FIG. 6. Finally, an implementation for the member function $f$ 824 of the neuralNet class is provided. In a first for-loop 826, an element of the input vector is input to each of the input-layer nodes. In a pair of nested for-loops 827, the activate function for each hidden-layer and output-layer node in the neural network is called, starting from the highest hidden layer and proceeding layer-by-layer to the output layer. In a final for-loop 828, the activation values of the output-layer nodes are collected into the output vectory.

Figure 9:
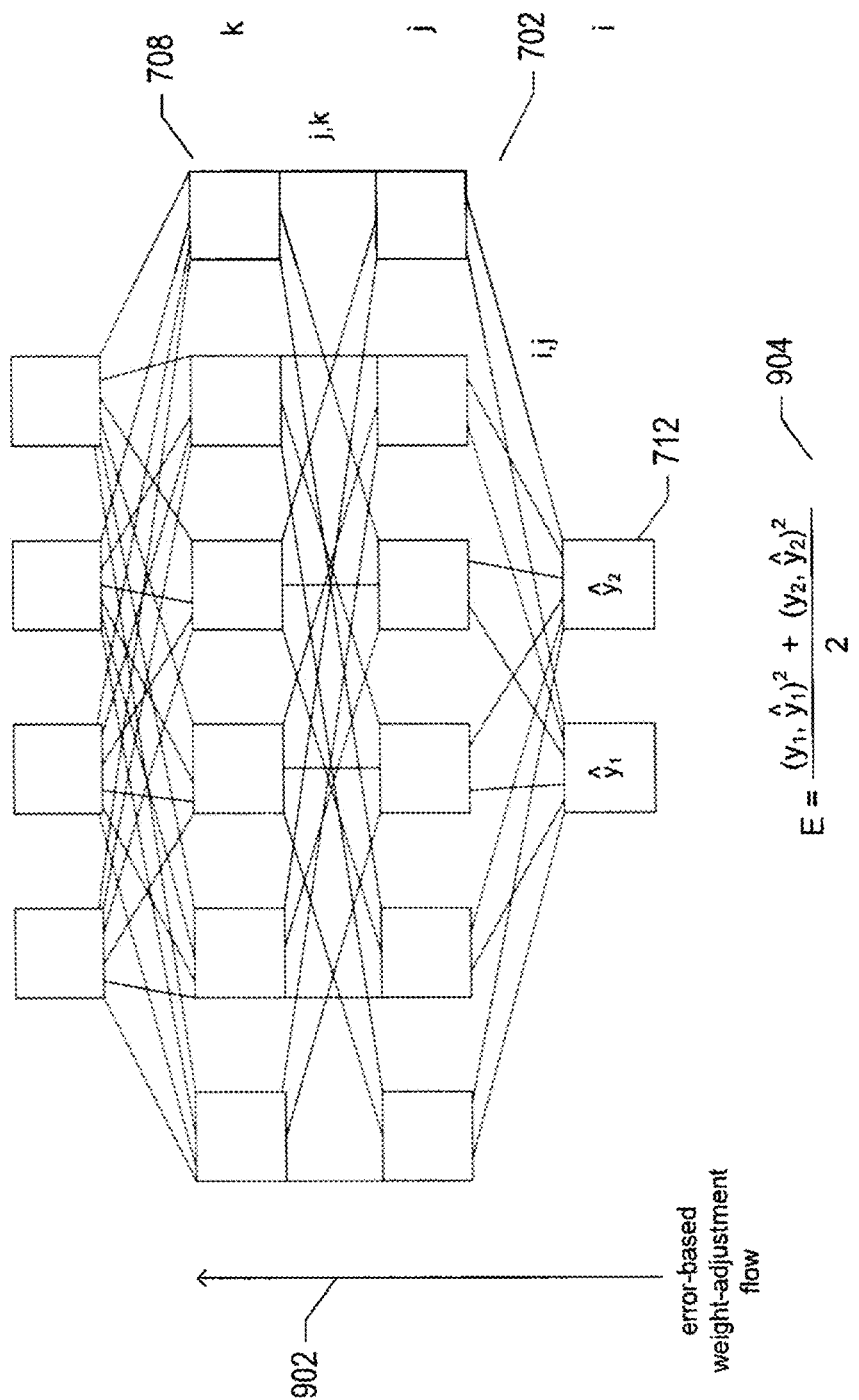
FIG. 9, using the same illustration conventions as used in FIG. 7, illustrates back propagation of errors through the neural network during training.

FIG. 9, using the same illustration conventions as used in FIG. 7, illustrates back propagation of errors through the neural network during training. As indicated by directed arrow 902, the error-based weight adjustment flows upward from the output-layer nodes 712 to the highest-level hidden-layer nodes 708. For the example neural network 702, the error, or loss, is computed according to expression 904. This loss is propagated upward through the connections between nodes in a process that proceeds in an opposite direction from the direction of activation transmission during generation of the output vector from the input vector. The back-propagation process determines, for each activation passed from one node to another, the value of the partial differential of the error, or loss, with respect to the weight associated with the activation. This value is then used to adjust the weight in order to minimize the error, or loss.

FIGS. 10A-B show the details of the weight-adjustment calculations carried out during back propagation. An expression for the total error, or loss, E with respect to an input-vector/label pair within a training dataset is obtained in a first set of expressions 1002, which is one half the squared distance between the points in a multidimensional space represented by the ideal output and the output vector generated by the neural network. The partial differential of the total error E with respect to a particular weight $w_{i,j}$ for the $j^{th}$ input of an output node i is obtained by the set of expressions 1004. In these expressions, the partial differential operator is propagated rightward through the expression for the total error E. An expression for the derivative of the activation function with respect to the input x produced by the input component of a node is obtained by the set of expressions 1006. This allows for generation of a simplified expression for the partial derivative of the total energy E with respect to the weight associated with the $j^{th}$ input of the $i^{th}$ output node 1008. The weight adjustment based on the total error E is provided by expression 1010, in which r has a real value in the range [0-1] that represents a learning rate, $a_j$ is the activation received through input j by node i, and $\Delta_i$ is the product of parenthesized terms, which include $a_i$ and $y_i$, in the first expression in expressions 1008 that multiplies $a_j$. FIG. 10B provides a derivation of the weight adjustment for the hidden-layer nodes above the output layer. It should be noted that the computational overhead for calculating the weights for each next highest layer of nodes increases geometrically, as indicated by the increasing number of subscripts for the $\Delta$ multipliers in the weight-adjustment expressions.

Figure 11A:
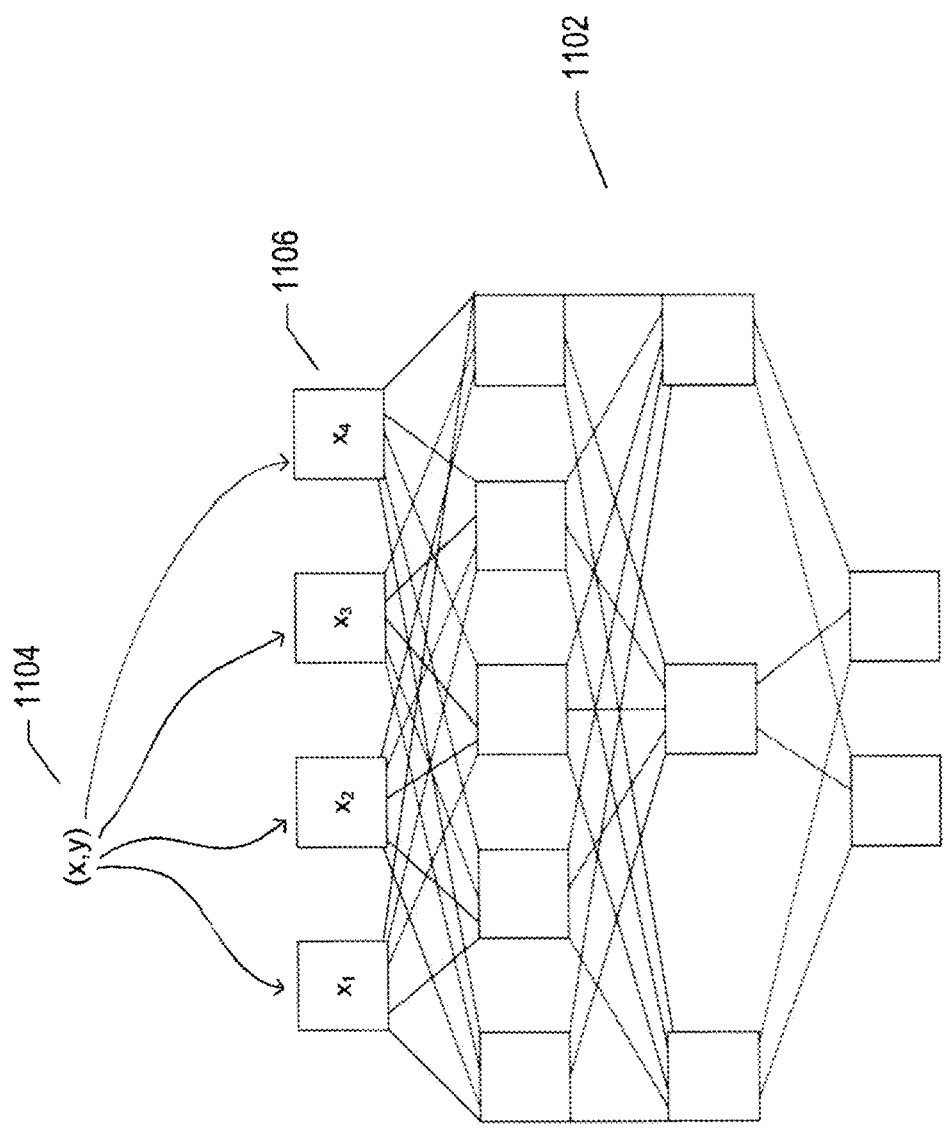
FIGS. 11A-I illustrate one iteration of the neural-network-training process.
Figure 11B:
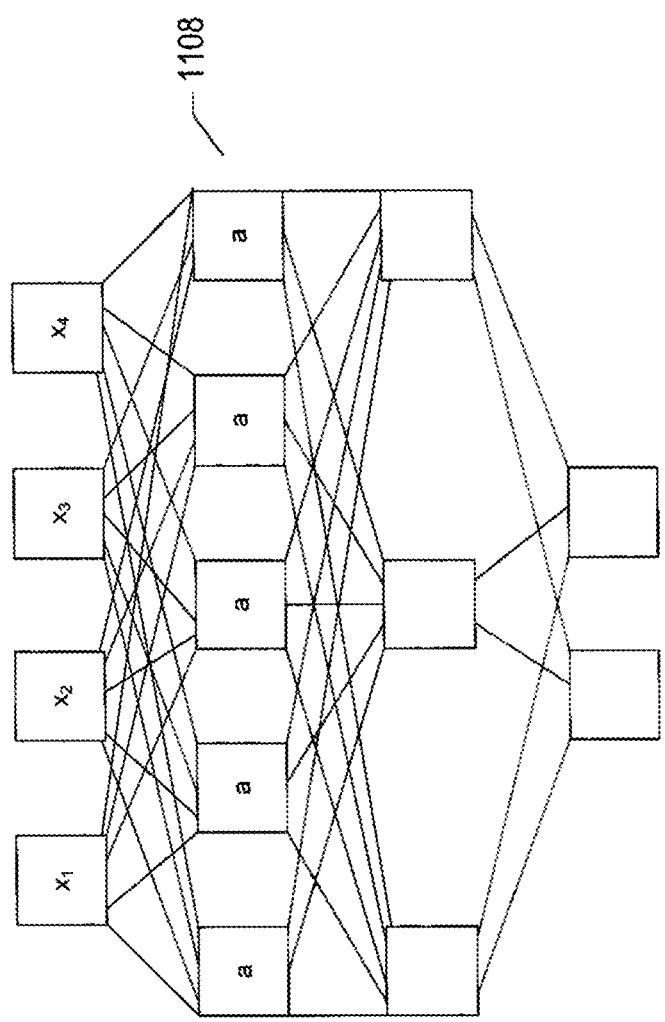
Figure 11C:
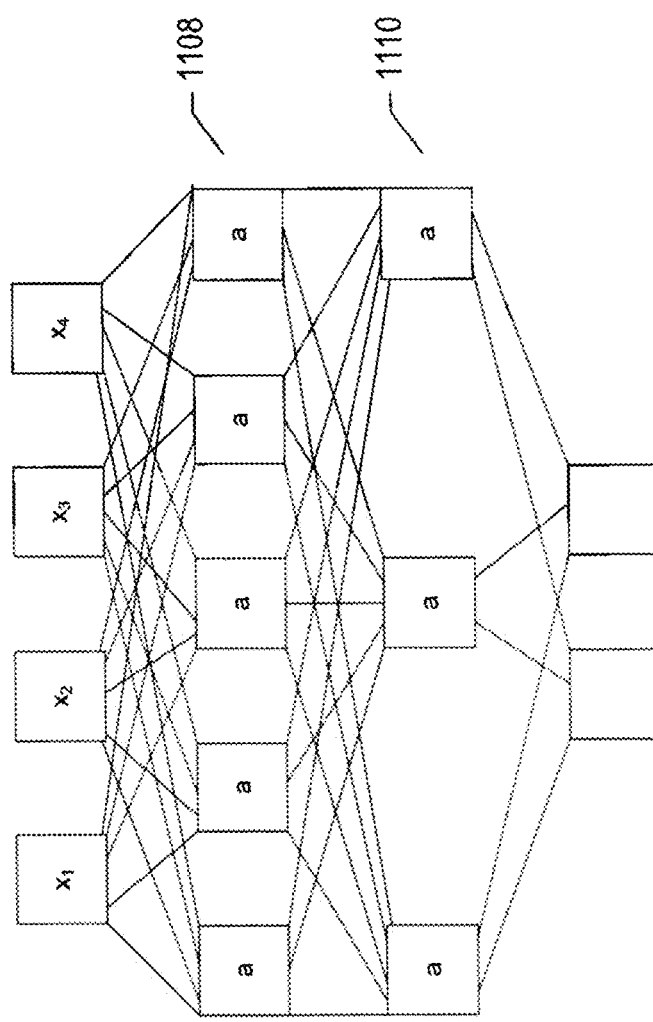
Figure 11D:
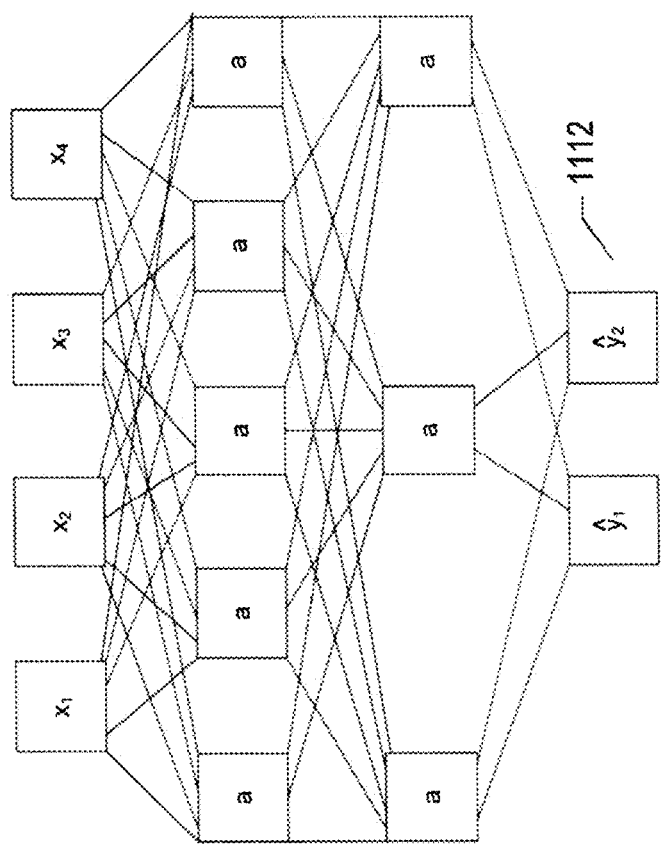
Figure 11E:
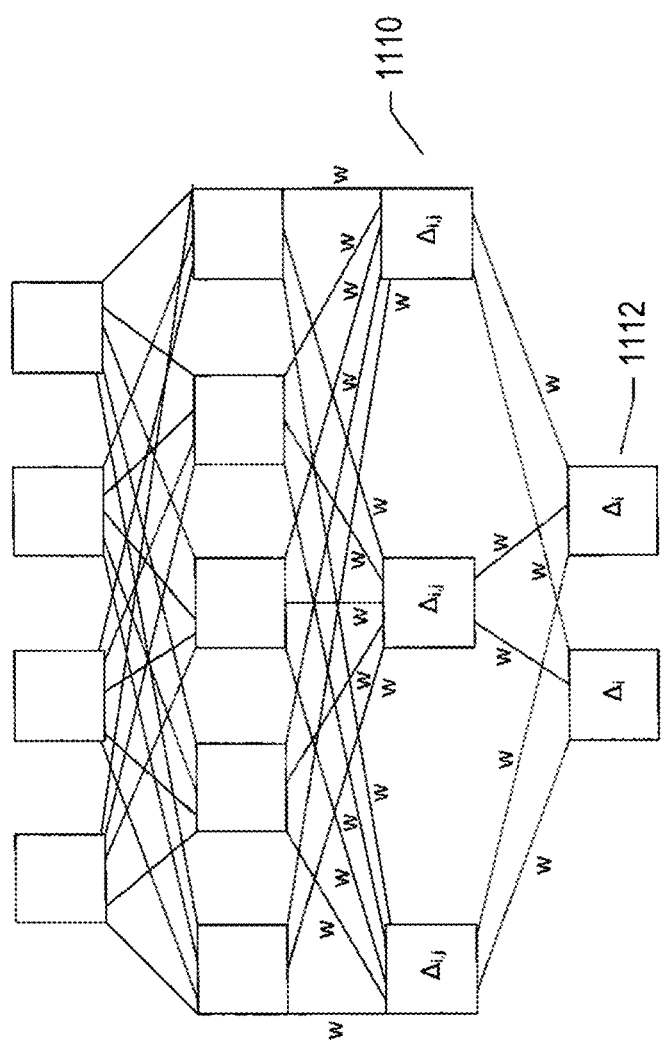
Figure 11F:
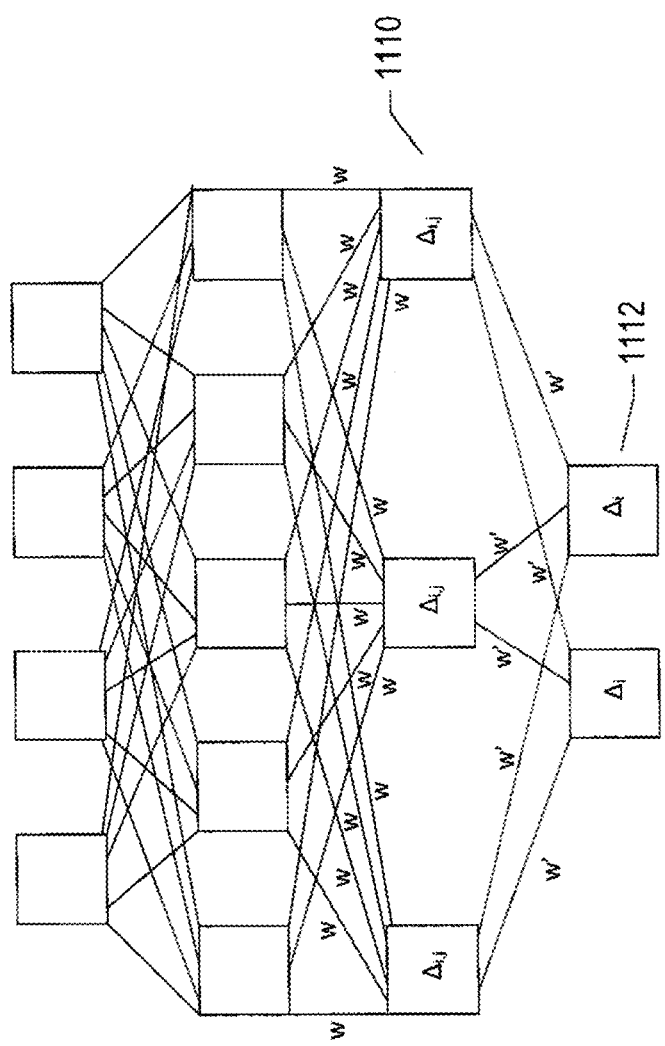
Figure 11G:
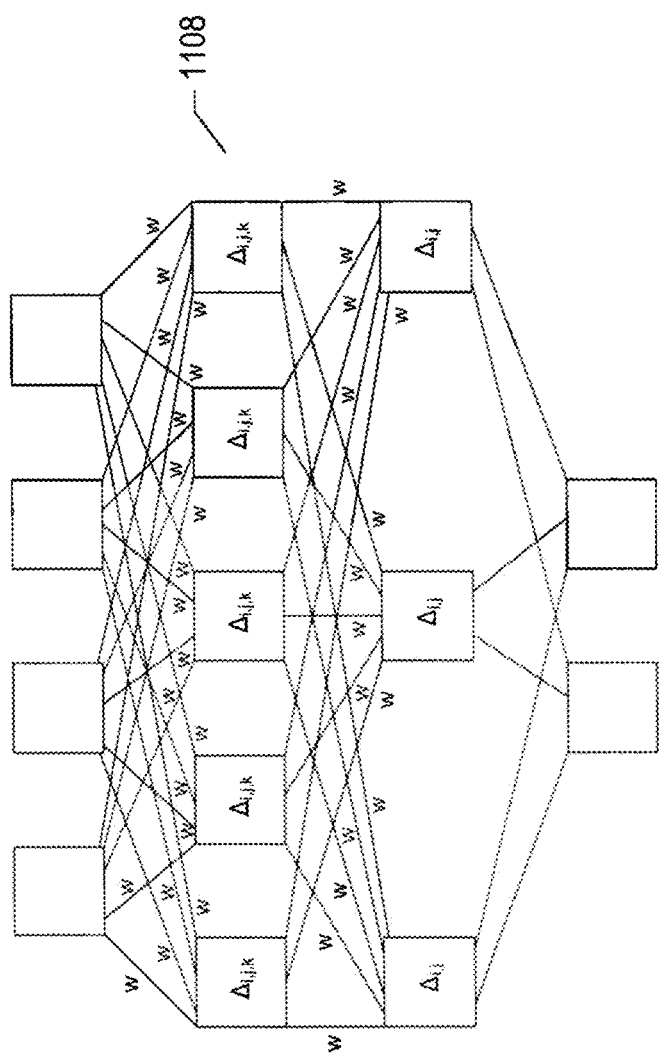
Figure 11H:
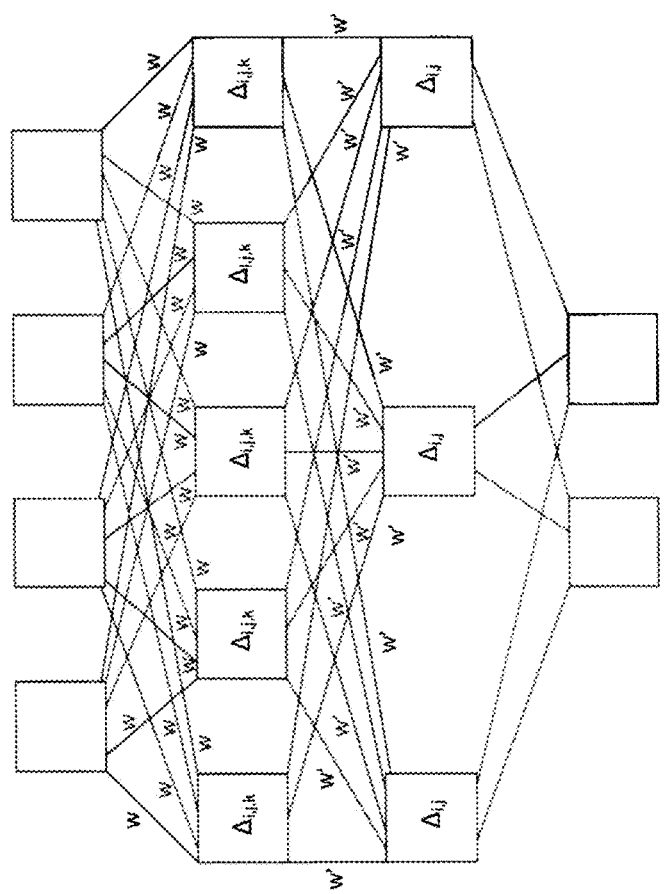
Figure 11I:
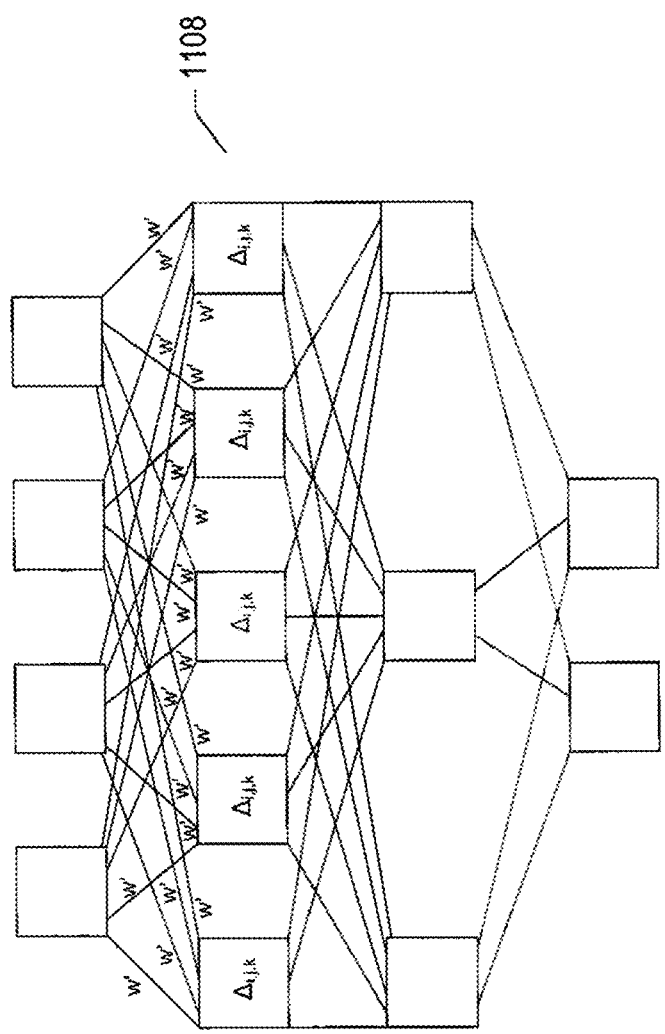

FIGS. 11A-I illustrate one iteration of the neural-network-training process. A simple, example neural-network 1102, illustrated using the same illustration conventions shown in FIGS. 7 and 9, is used in each of FIGS. 11A-I. In FIG. 11A, the input vector of an input-vector/label pair 1104 is input to the input-layer nodes 1106. In FIG. 11B, each node in the highest-level hidden layer 1108 generates an activation via a weighted sum of input activations transmitted to the node from the input nodes. In FIG. 11C, each node in the second hidden layer 1110 generate an activation via a weighted sum of the activations input to them from nodes of the higher-level hidden layer 1108. In FIG. 11D, the output-layer nodes 1112 generate activations from the activations received from the second hidden layer nodes. The activations generated by the output-layer nodes correspond to the values of the elements of the output vector ŷ. In FIG. 11E, multipliers $\Delta_i$ of the activations for weight adjustments are computed by the output-layer nodes 1112 and multipliers $\Delta_{i,j}$ of the activations for weight adjustments are computed by the second layer of hidden nodes 1110. In FIG. 11F, the weights w associated with inputs to the output-layer nodes are adjusted to new weights w'. This is done after the multipliers of the activations to the weight adjustments of the second hidden-node layer are generated, since generation of those multipliers depends on the original weights associated with inputs to the output-layer nodes. In FIG. 11O, the multipliers of the activations for the weight adjustments of the highest-level hidden-layer nodes 1108 are generated. In FIG. 11F, the weights for the activations passed between the two hidden layers are adjusted. Finally, in FIG. 11I, the weights for the connections between the input nodes and the highest-level hidden-layer nodes 1108 are adjusted.

Figure 12A:
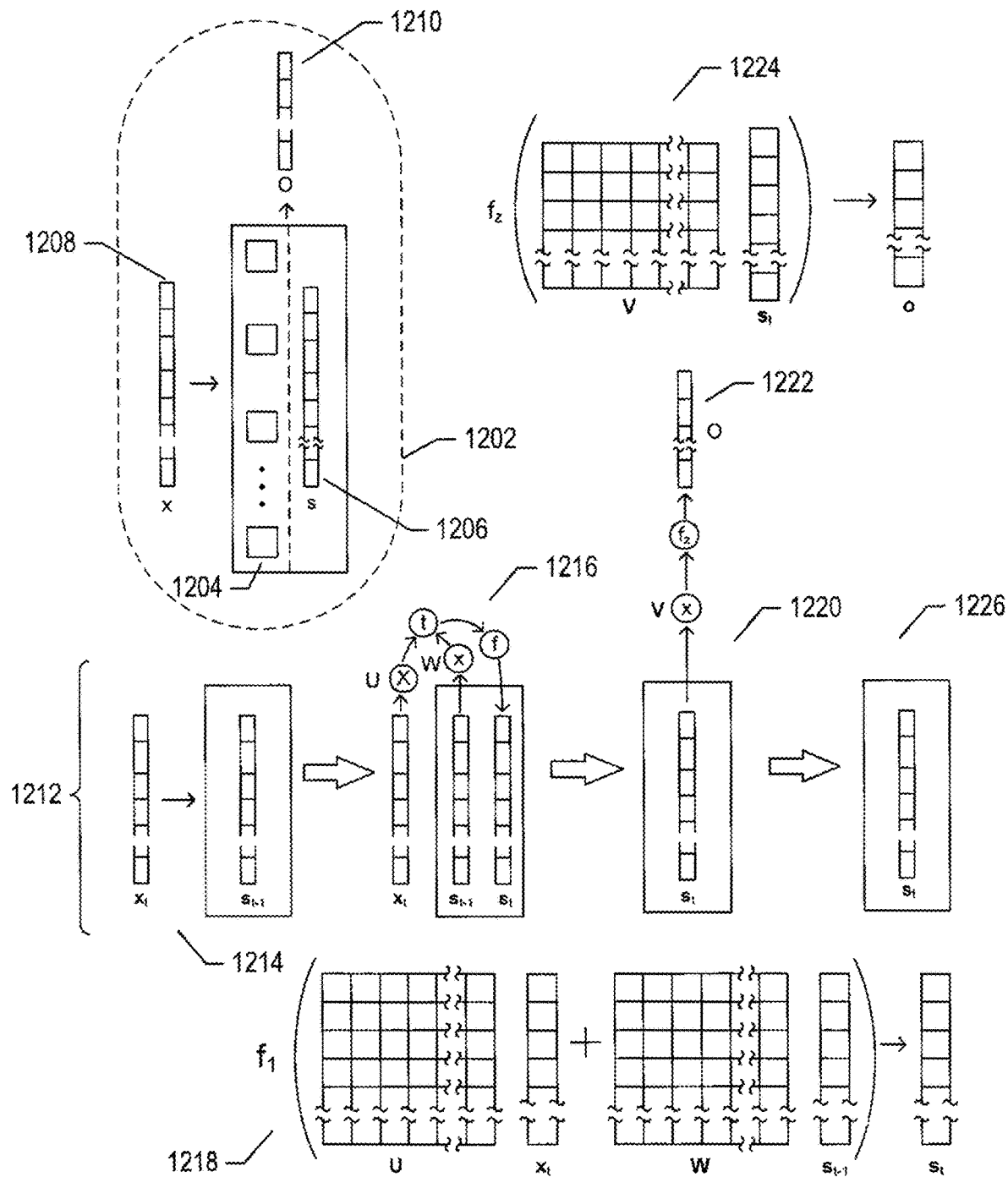
FIGS. 12A-B illustrate various aspects of recurrent neural networks.
Figure 12B:
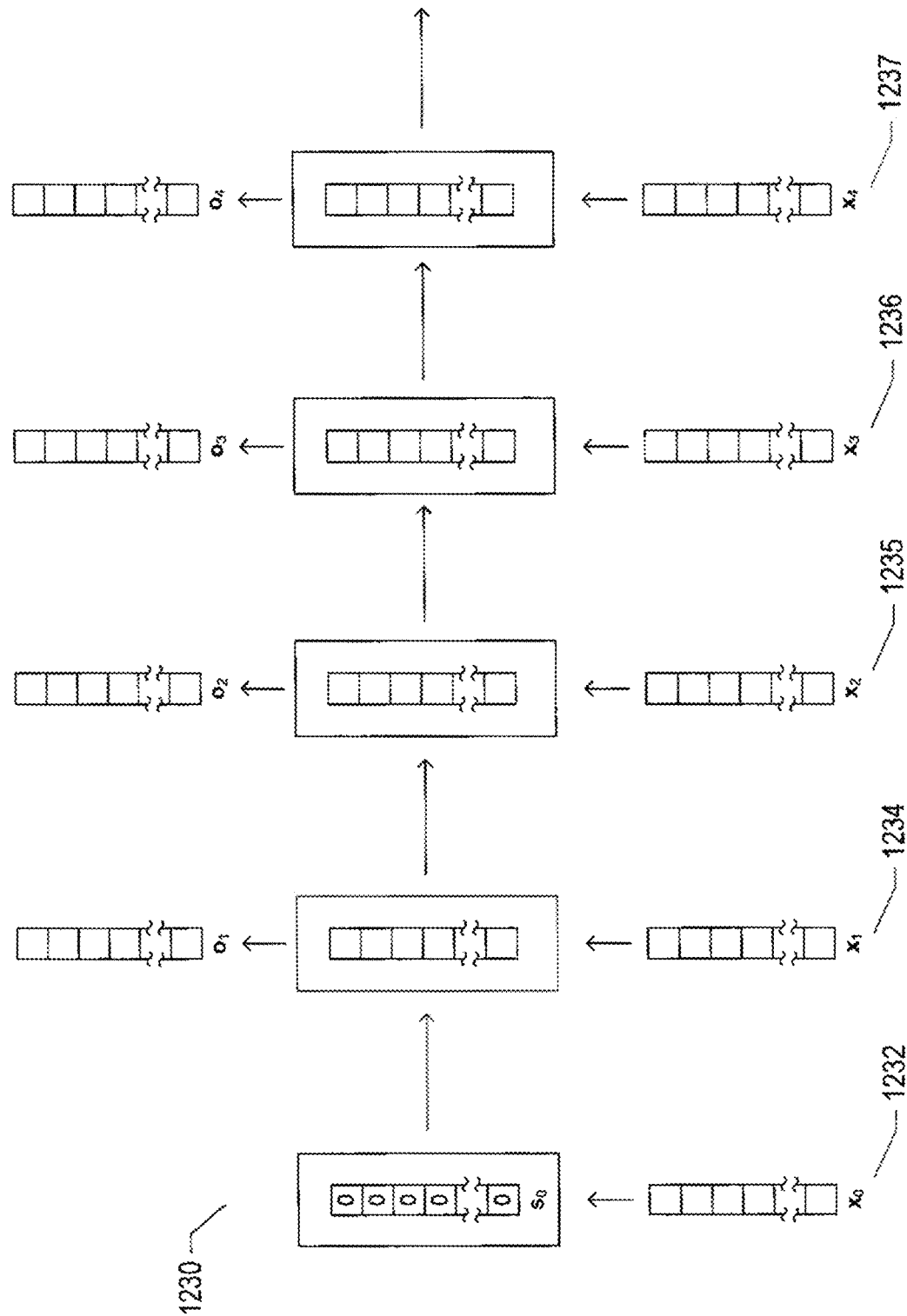

A second type of neural network, referred to as a "recurrent neural network," is employed to generate sequences of output vectors from sequences of input vectors. These types of neural networks are often used for natural-language applications in which a sequence of words forming a sentence are sequentially processed to produce a translation of the sentence, as one example. FIGS. 12A-B illustrate various aspects of recurrent neural networks. Inset 1202 in FIG. 12A shows a representation of a set of nodes within a recurrent neural network. The set of nodes includes nodes that are implemented similarly to those discussed above with respect to the feed-forward neural network 1204, but additionally include an internal state 1206. In other words, the nodes of a recurrent neural network include a memory component. The set of recurrent-neural-network nodes, at a particular time point in a sequence of time points, receives an input vector x 1208 and produces an output vector 1210. The process of receiving an input vector and producing an output vector is shown in the horizontal set of recurrent-neural-network-nodes diagrams interleaved with large arrows 1212 in FIG. 12A. In a first step 1214, the input vector x at time t is input to the set of recurrent-neural-network nodes which include an internal state generated at time t−1. In a second step 1216, the input vector is multiplied by a set of weights U and the current state vector is multiplied by a set of weights W to produce two vector products which are added together to generate the state vector for time t. This operation is illustrated as a vector function $f_1$ 1218 in the lower portion of FIG. 12A. In a next step 1220, the current state vector is multiplied by a set of weights V to produce the output vector for time t 1222, a process illustrated as a vector function $f_2$ 1224 in FIG. 12A. Finally, the recurrent-neural-network nodes are ready for input of a next input vector at time t+1, in step 1226.

FIG. 12B illustrates processing by the set of recurrent-neural-network nodes of a series of input vectors to produce a series of output vectors. At a first time $t_0$ 1230, a first input vector $x_0$ 1232 is input to the set of recurrent-neural-network nodes. At each successive time point 1234-1237, a next input vector is input to the set of recurrent-neural-network nodes and an output vector is generated by the set of recurrent-neural-network nodes. In many cases, only a subset of the output vectors are used. Back propagation of the error or loss during training of a recurrent neural network is similar to back propagation for a feed-forward neural network, except that the total error or loss needs to be back-propagated through time in addition to through the nodes of the recurrent neural network. This can be accomplished by unrolling the recurrent neural network to generate a sequence of component neural networks and by then back-propagating the error or loss through this sequence of component neural networks from the most recent time to the most distant time period.

Figure 13:
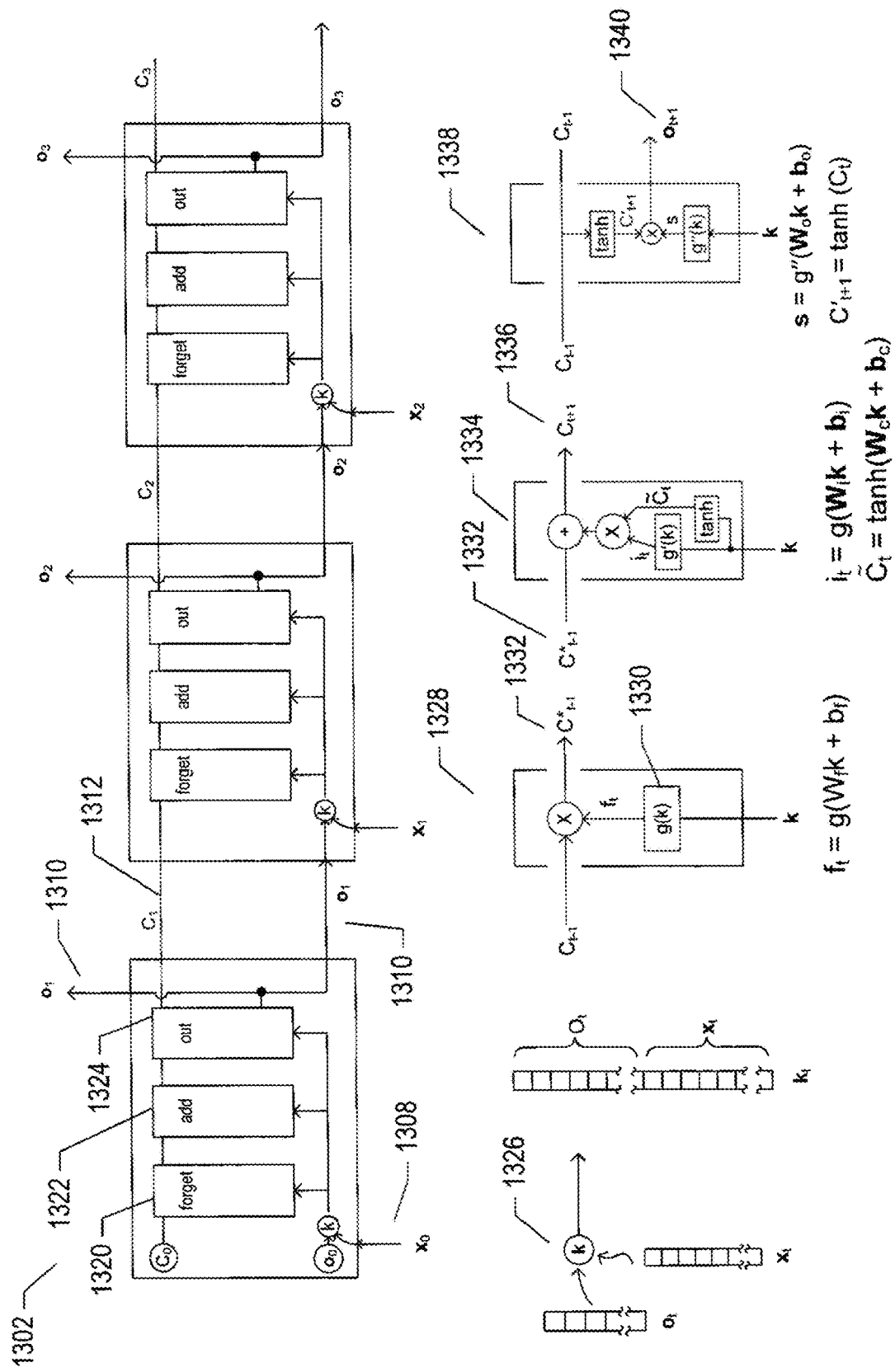
FIG. 13 illustrates a type of recurrent-neural-network node referred to as a long-short-term-memory ("LSTM") node.

Finally, for completeness, FIG. 13 illustrates a type of recurrent-neural-network node referred to as a long-short-term-memory ("LSTM") node. In FIG. 13, a LSTM node 1302 is shown at three successive points in time 1304-1306. State vectors and output vectors appear to be passed between different nodes, but these horizontal connections instead illustrate the fact that the output vector and state vector are stored within the LSTM node at one point in time for use at the next point in time. At each time point, the LSTM node receives an input vector 1308 and outputs an output vector 1310. In addition, the LSTM node outputs a current state 1312 forward in time. The LSTM node includes a forget module 1320, an add module 1322, and an out module 1324. Operations of these modules are shown in the lower portion of FIG. 13. First, the output vector produced at the previous time point and the input vector received at a current time point are concatenated to produce a vector k 1326. The forget module 1328 computes a set of multipliers 1330 that are used to element-by-element multiply the state from time t−1 in order to produce an altered state 1332. This allows the forget module to delete or diminish certain elements of the state vector. The add module 1334 employs an activation function to generate a new state 1336 from the altered state 1332. Finally, the out module 1338 applies an activation function to generate an output vector 1340 based on the new state and the vector k. An LSTM node, unlike the recurrent-neural-network node illustrated in FIG. 12A, can selectively alter the internal state to reinforce certain components of the state and deemphasize or forget other components of the state in a manner reminiscent of human short-term memory. As one example, when processing a paragraph of text, the LSTM node may reinforce certain components of the state vector in response to receiving new input related to previous input but may diminish components of the state vector when the new input is unrelated to the previous input, which allows the LSTM to adjust its context to emphasize inputs close in time and to slowly diminish the effects of inputs that are not reinforced by subsequent inputs. Here again, back propagation of a total error or loss is employed to adjust the various weights used by the LSTM, but the back propagation is significantly more complicated than that for the simpler recurrent neural-network nodes discussed with reference to FIG. 12A.

Neural networks are only one of many different types of machine-learning systems that employ back propagation of computed errors, or loss, during training sessions. The discussion of neural networks, provided above, is intended to provide a context for the currently disclosed methods and systems, discussed below. The currently disclosed methods and systems can be applied to any of many different types of machine-learning systems in addition to the various types of neural networks.

Figure 14A:
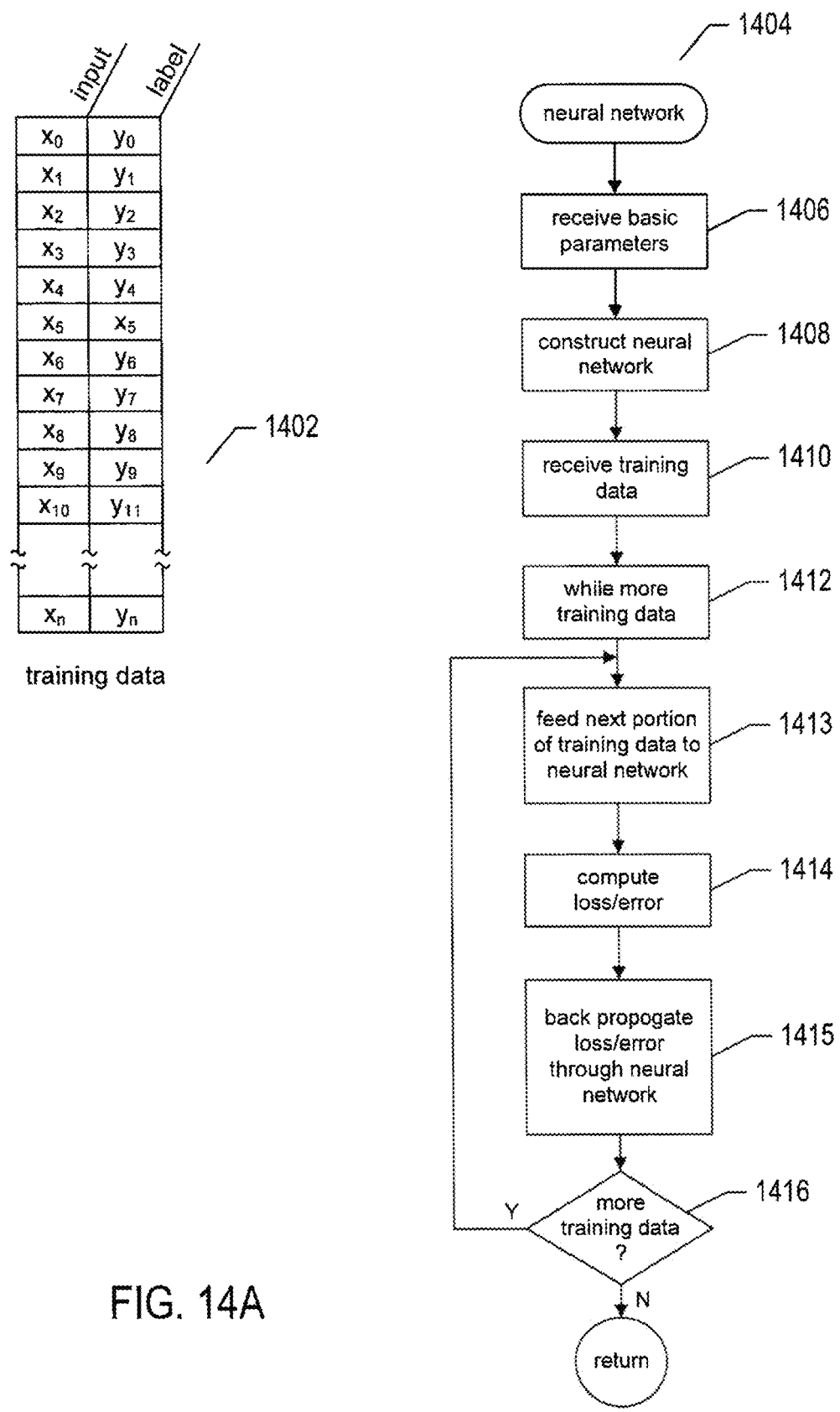
FIGS. 14A-C illustrate neural-network training as an example of machine-learning-based-subsystem training.
Figure 14B:
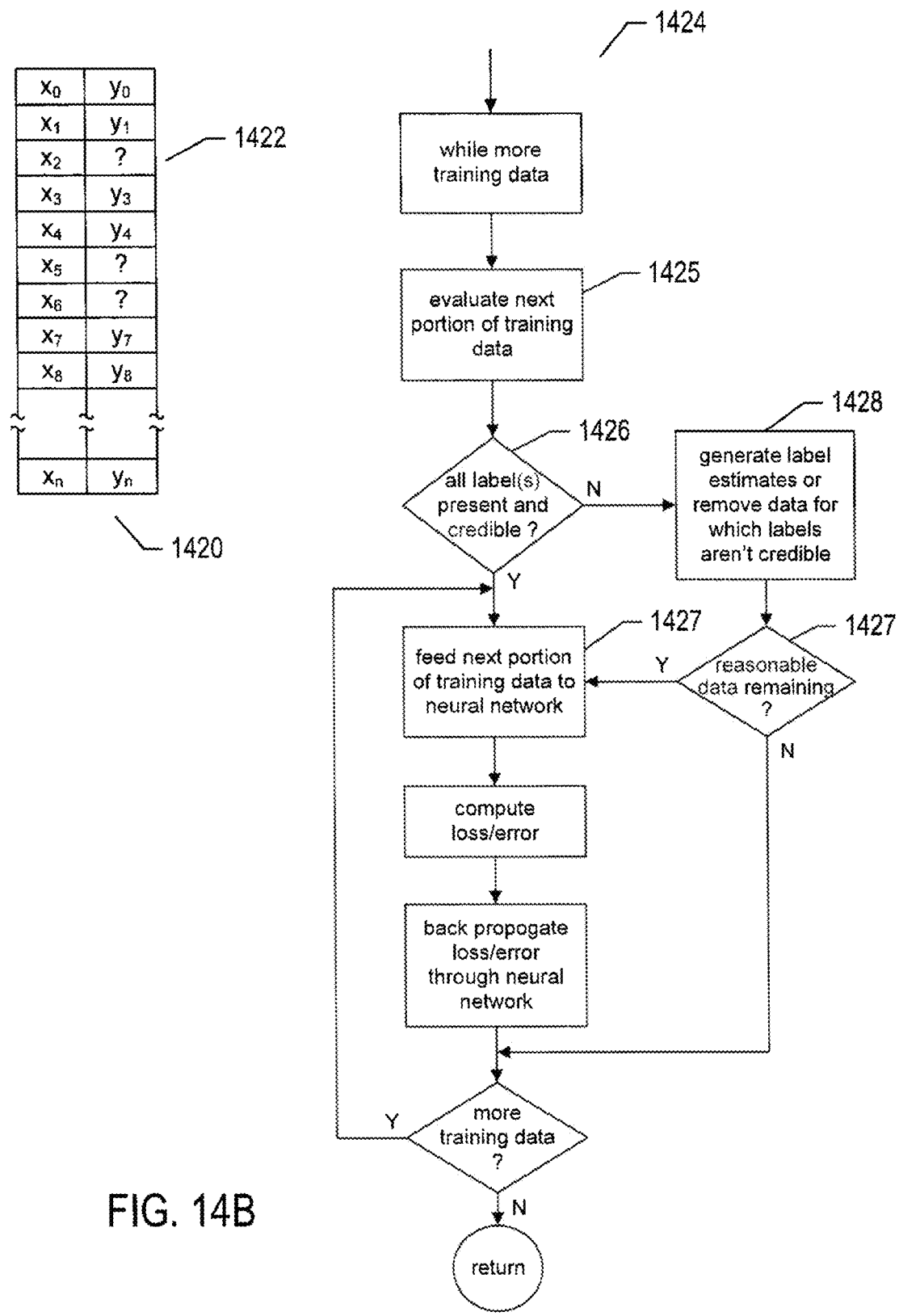
Figure 14C:
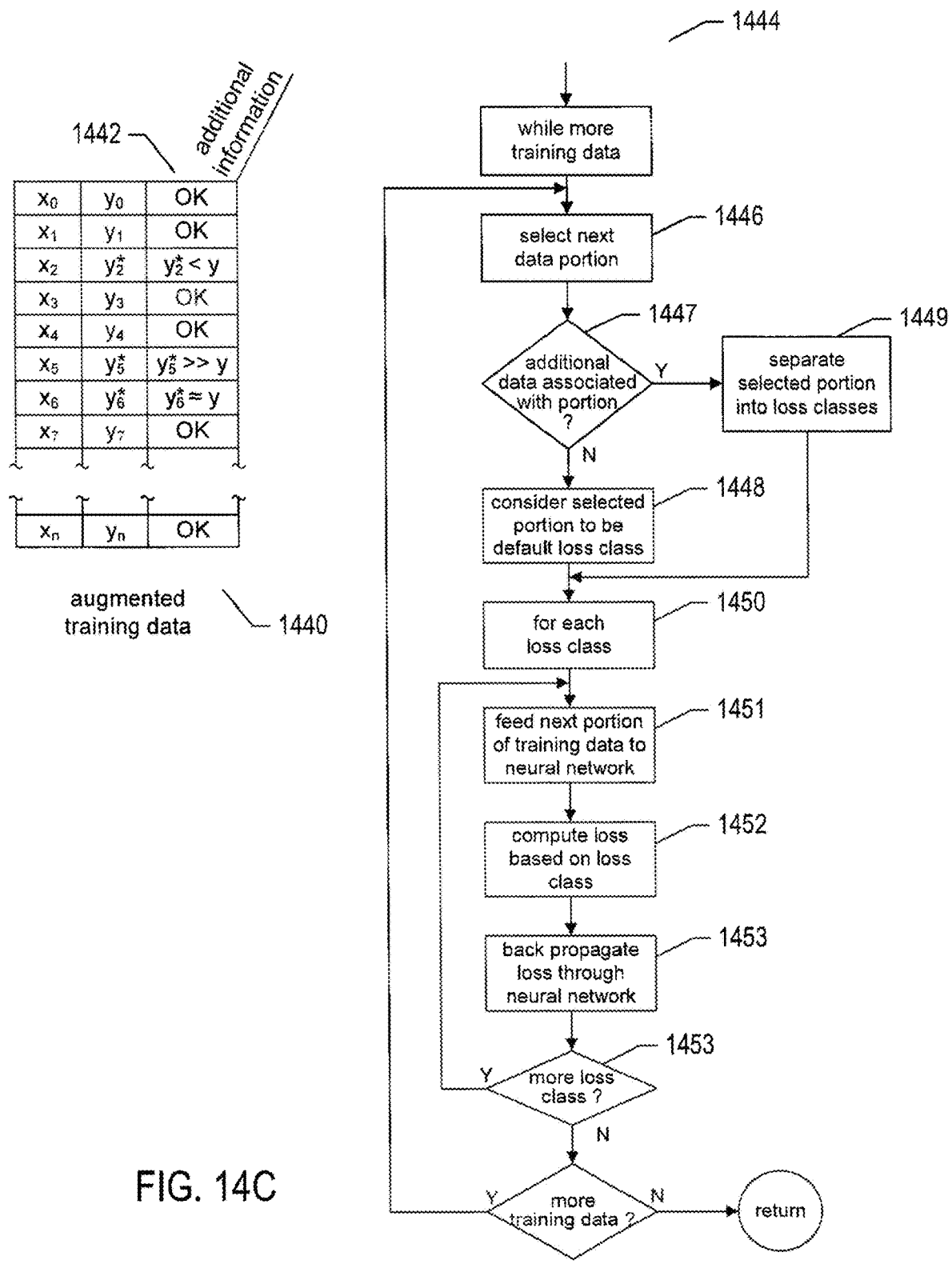

FIGS. 14A-C illustrate neural-network training as an example of machine-learning-based-subsystem training. FIG. 14A illustrates the construction and training of a neural network using a complete and accurate training dataset. The training dataset is shown as a table of input-vector/label pairs 1402, in which each row represents an input-vector/label pair. The control-flow diagram 1404 illustrates construction and training of a neural network using the training dataset. In step 1406, basic parameters for the neural network are received, such as the number of layers, number of nodes in each layer, node interconnections, and activation functions. In step 1408, the specified neural network is constructed. This involves building representations of the nodes, node connections, activation functions, and other components of the neural network in one or more electronic memories and may involve, in certain cases, various types of code generation, resource allocation and scheduling, and other operations to produce a fully configured neural network that can receive input data and generate corresponding outputs. In many cases, for example, the neural network may be distributed among multiple computer systems and may employ dedicated communications and shared memory for propagation of activations and total error or loss between nodes. It should again be emphasized that a neural network is a physical system comprising one or more computer systems, communications subsystems, and often multiple instances of computer-instruction-implemented control components.

In step 1410, training data represented by table 1402 is received. Then, in the while-loop of steps 1412-1416, portions of the training data are iteratively input to the neural network, in step 1413, the loss or error is computed, in step 1414, and the computed loss or error is back-propagated through the neural network step 1415 to adjust the weights. The control-flow diagram refers to portions of the training data rather than individual input-vector/label pairs because, in certain cases, groups of input-vector/label pairs are processed together to generate a cumulative error that is back-propagated through the neural network. A portion may, of course, include only a single input-vector/label pair.

FIG. 14B illustrates one method of training a neural network using an incomplete training dataset. Table 1420 represents the incomplete training dataset. For certain of the input-vector/label pairs, the label is represented by a "?" symbol, such as in the input-vector/label pair 1422. The "?" symbol indicates that the correct value for the label is unavailable. This type of incomplete data set may arise from a variety of different factors, including inaccurate labeling by human annotators, various types of data loss incurred during collection, storage, and processing of training datasets, and other such factors. The control-flow diagram 1424 illustrates alterations in the while-loop of steps 1412-1416 in FIG. 14A that might be employed to train the neural network using the incomplete training dataset. In step 1425, a next portion of the training dataset is evaluated to determine the status of the labels in the next portion of the training data. When all of the labels are present and credible, as determined in step 1426, the next portion of the training dataset is input to the neural network, in step 1427, as in FIG. 14A. However, when certain labels are missing or lack credibility, as determined in step 1426, the input-vector/label pairs that include those labels are removed or altered to include better estimates of the label values, in step 1428. When there is reasonable training data remaining in the training-data portion following step 1428, as determined in step 1429, the remaining reasonable data is input to the neural network in step 1427. The remaining steps in the while-loop are equivalent to those in the control-flow diagram shown in FIG. 14A. Thus, in this approach, either suspect data is removed or better labels are estimated, based on various criteria, for substitution for the suspect labels. However, this approach is deficient in many ways. First, training datasets are generally designed to span or cover the expected types of inputs that will be subsequently received by neural network. When input-vector/label pairs are removed, the remaining input-vector/label pairs may not effectively span or cover the expected types of inputs that will be subsequently received, as a result of which training may produce a neural network that is insufficiently accurate or reliable. Second, this approach assumes that better label values can be estimated, but this is often not the case. The data can be severely biased by label-estimation inaccuracies. Furthermore, label estimates may introduce inaccuracies in neural-network performance because they falsely generate seemingly precisely-calculated errors based on imprecise label-value estimates. Third, this approach may be extremely time-consuming and inefficient. For many commercial neural networks, the training datasets may include millions, tens of millions, or more input-vector/label pairs, as a result of which neural-network training can take many hours, days, or longer, even on powerful distributed supercomputers. Monitoring the training dataset to detect suspect labels and generating better estimates for suspect labels could easily extend training times to months, years, or even longer time periods.

FIG. 14C illustrates the currently disclosed methods and systems for using incomplete training datasets to train neural networks and other machine-learning-based systems. Table 1440 represents an augmented training dataset generated from an incomplete training dataset, such as incomplete training dataset 1420 in FIG. 14B. The augmented training dataset includes additional information for the input-vector/label pairs represented by column 1442. In this example, the additional information can be encoded as 6 different numeric values. The additional information includes the values: (1) OK, indicating that the label is credible; (2)<, indicating that the label is likely less than the true label value, where the symbol "<" may refer to a directed distance between a point represented by the label and a volume that likely contains the true label value; (3) <<, indicating that the label is likely very much less than the true label value; (4) =, indicating that the label is likely close in value to the true label value; (5) >, indicating that the label is likely greater in value than the true label value; and (6) >>, indicating that the label is likely very much greater in value than the true label value. Note that this additional information does not represent precise estimates of the true values of suspect labels, but only provides general characterizations that may be generated by automated or semi-automated methods. The control-flow diagram 1444 indicates alterations of the while-loop of steps 1412-1416 in FIG. 14A that implement the currently disclosed methods and systems for using incomplete training datasets to train neural networks and other machine-learning-based systems. In step 1446, the next portion of the training data is selected. In step 1447, the method determines whether there is additional data associated with the input-vector/label pairs in the selected data other than OK indications. If not, the selected portion of training data is considered to be a single default loss class 1448. Otherwise, in step 1449, the selected portion of training data is mapped to loss classes, each loss class corresponding to one of the six possible additional-information values. Then, in the for-loop of steps 1450-1454, each loss class is separately input to the neural network. In step 1451, a loss is computed from the results using a loss-computation method particular to the loss class, in step 1452, and the loss-class-specific loss is back-propagated through the neural network in step 1453. Thus, the currently disclosed methods and systems employ loss-class classification of the input-vector/label pairs in the training dataset to compute losses specific to each of the loss-class classifications rather than attempting to correct or estimate better label values for suspect label values. The currently disclosed methods and systems address the above-discussed deficiencies of above-discussed label-value-estimation approaches. Loss-class-specific loss computation can be carried out without introducing biases and inaccuracies due to inaccurate specific estimations of label values. The augmenting additional information may be generated by automated or semi-automated methods and can thus be generated far more efficiently and quickly than can estimates of particular label values. This approach may also preserve many more input-vector/label pairs than can be rescued by label-value-estimation approaches.

It should be noted that the phrase "loss class" does not imply that the loss classes are discrete and non-overlapping and does not imply that the loss classes are non-intersecting subsets that sum to the entire training-data space although, in certain cases, they may be. The loss classes are determined by the additional information and represent an intermediate value, in the implementation discussed below, between the additional information associated with an input-vector/label pair and parameters values for an appropriate loss function. Both the parameter values and the transitions of the form of the loss function related to changes in the parameter values may be discrete, in certain implementations, and continuous, in other implementations.

Figure 15A:
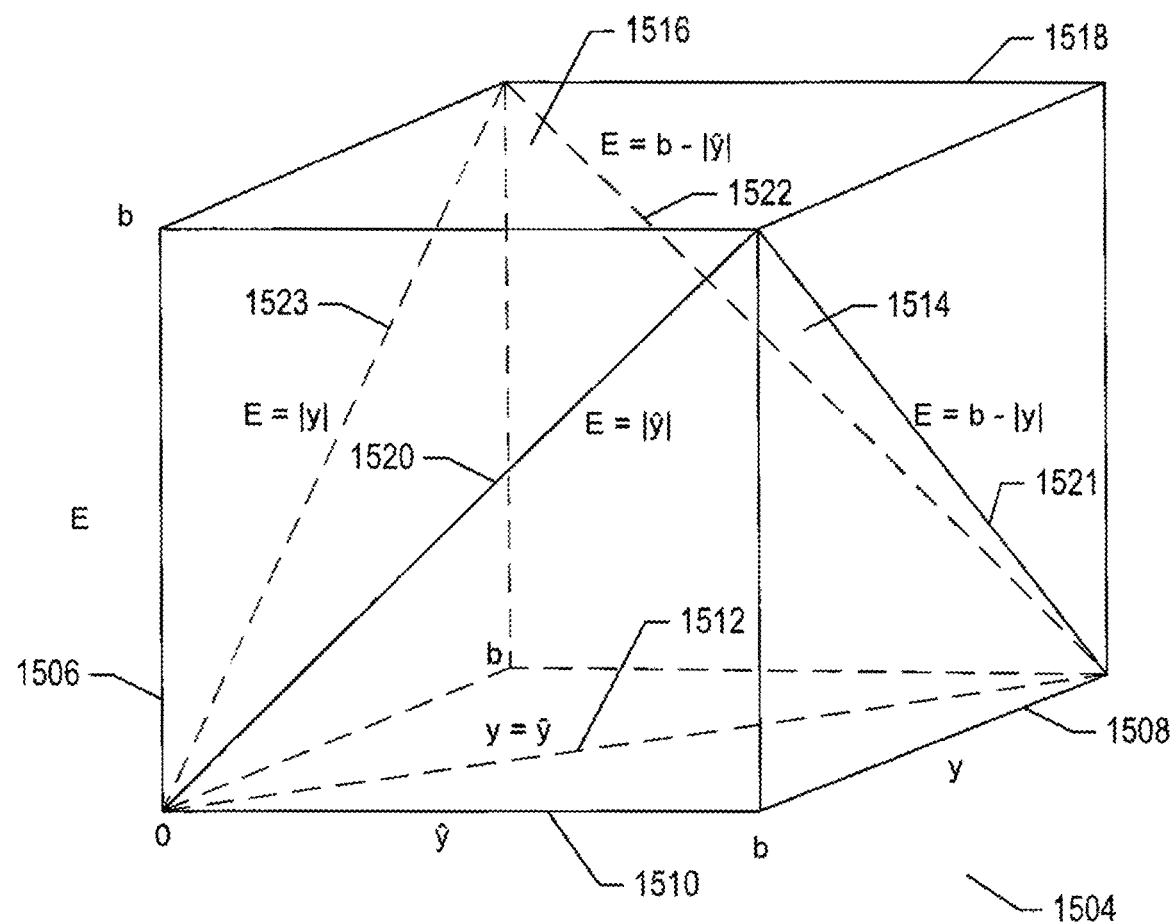
FIGS. 15A-C illustrate the distance error or loss discussed above with reference to FIG. 6.
Figure 15B:
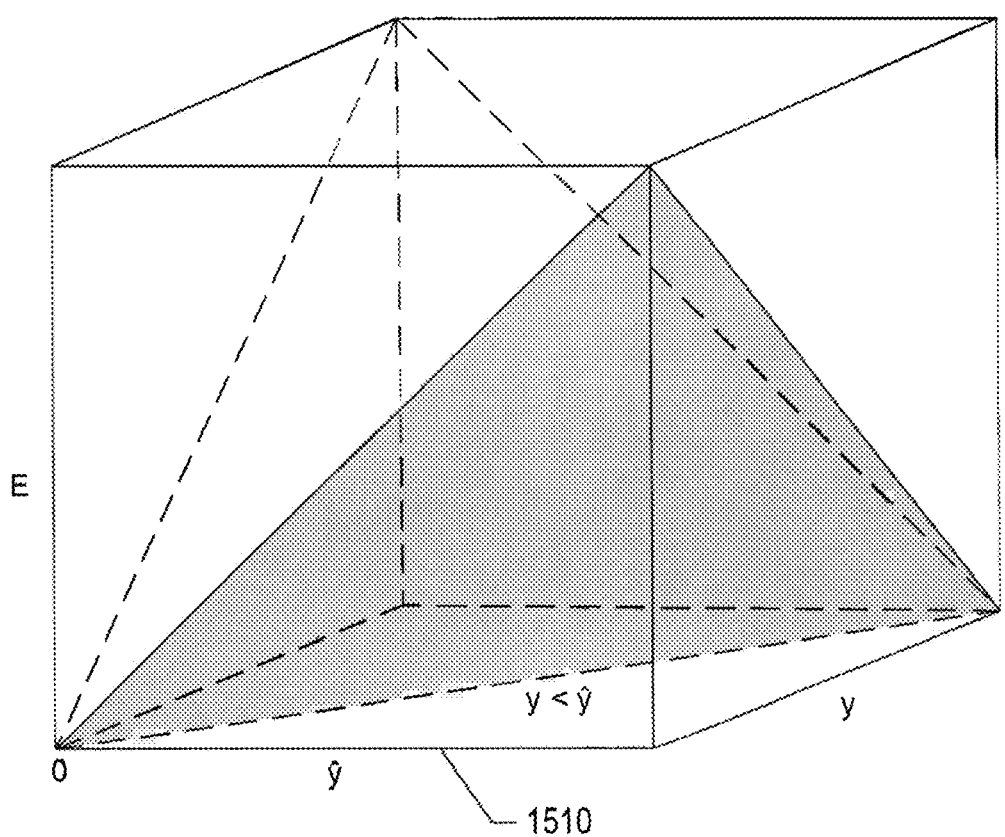
Figure 15C:
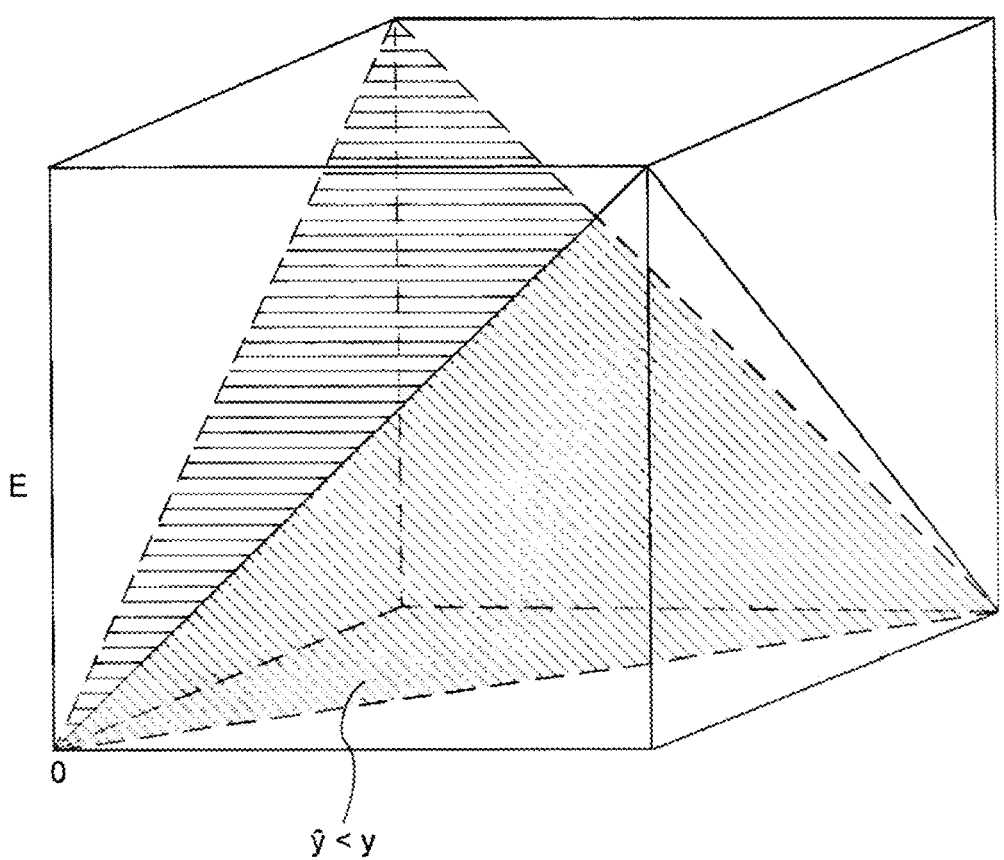

FIGS. 15A-C illustrate the distance-based error or loss discussed above with reference to FIG. 6. An expression 1502 for this loss is provided at the top of FIG. 15A. A representation 1504 of a portion of the surface represented by this expression is provided in the lower portion of FIG. 15A. The distance-based error E is represented by the vertical axis 1506, the ideal-label value is represented by axis 1508, and the output value produced by a physical neural network is represented by axis 1510. When the output value ŷ is equal to the ideal label value y, the error is 0, as represented by diagonal dashed line 1512. When the output value is greater than the ideal label value, the error E falls along surface 1514 inclined outward from the dashed diagonal line 1512. When the output value is less than the ideal-label value, the error E falls along surface 1516 inclined away from diagonal dashed line 1512. These two surfaces appear triangular because only portions of the surfaces enclosed within cube 1518 are shown. Diagonal lines 1520-1523 represent intersections of the surfaces with the sides of the cube. The two dihedral surfaces form a trough in three-dimensional space. FIG. 15B emphasizes the surface corresponding to error values when the output value is greater than the ideal-label value. FIG. 15C emphasizes the surface corresponding to error values when the output value is less than the ideal-label value.

Figure 16:
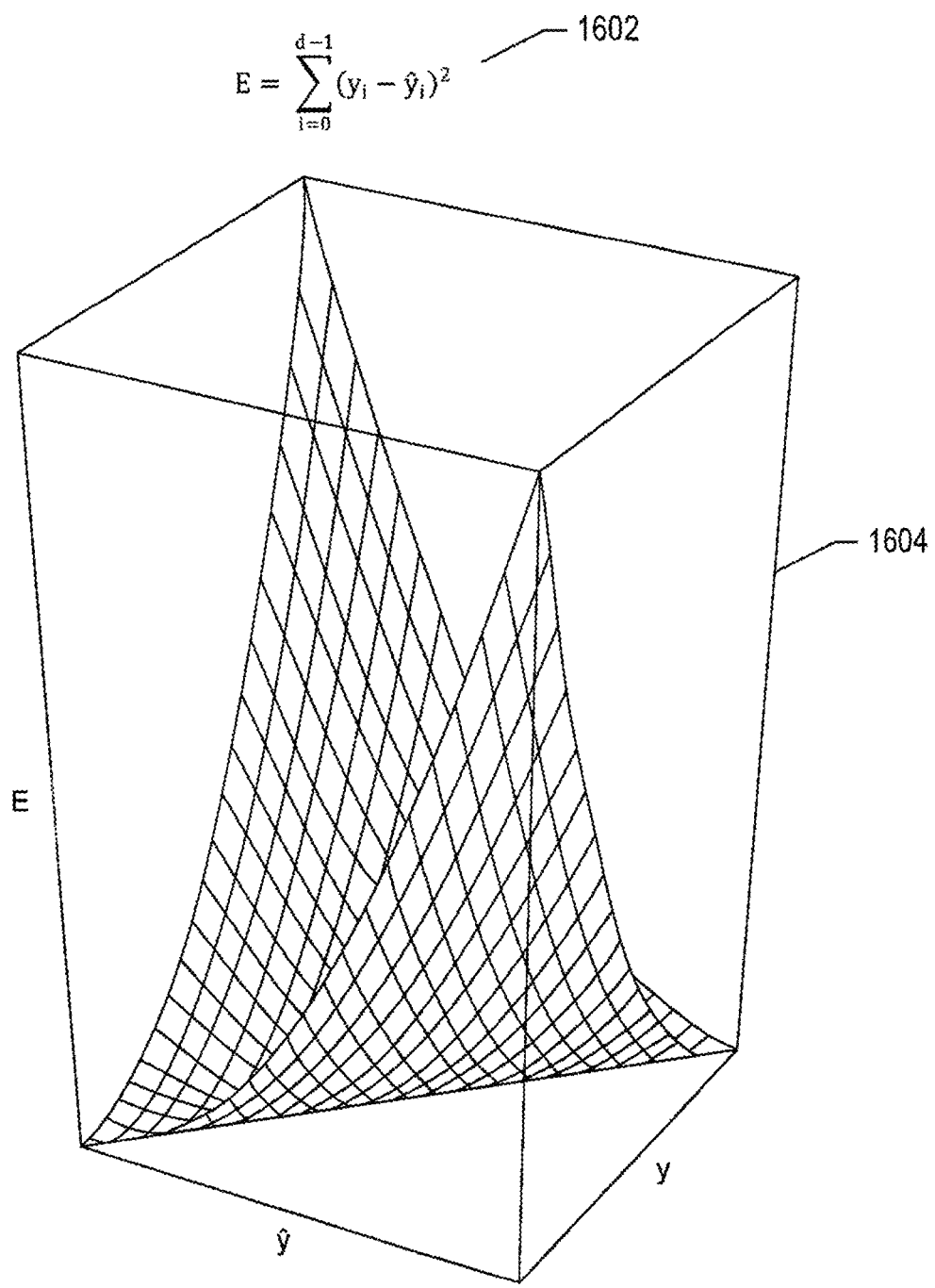
FIG. 16 illustrates the squared-distance error value.

FIG. 16 illustrates the squared-distance error value. An expression for the squared-distance error value 1602 is shown at the top of FIG. 16. A three-dimensional plot of portions of the surface within the rectangular volume 1604 is provided in the lower portion of FIG. 16. The squared-distance error is related to the distance error, but is nonlinear and continuously differentiable.

Figure 17A:
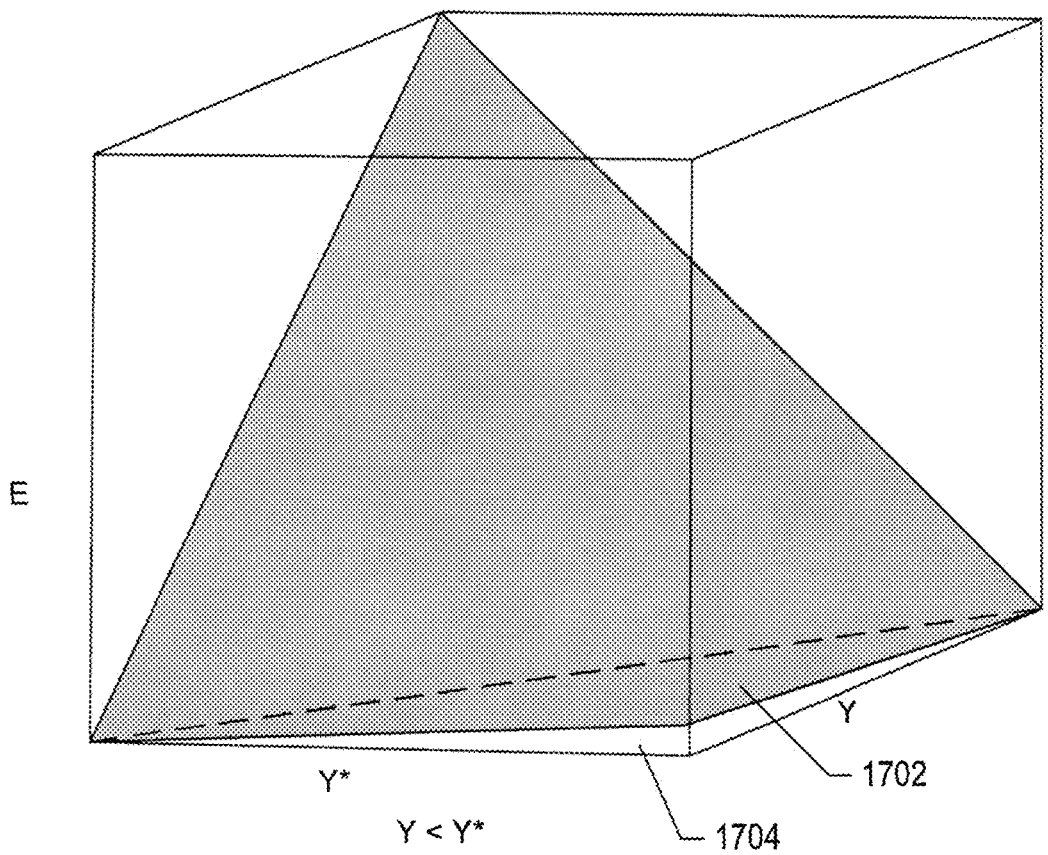
FIGS. 17A-C illustrate alterations of the distance-based loss function that attempt to incorporate additional information provided for suspect labels in an augmented training dataset.
Figure 17B:
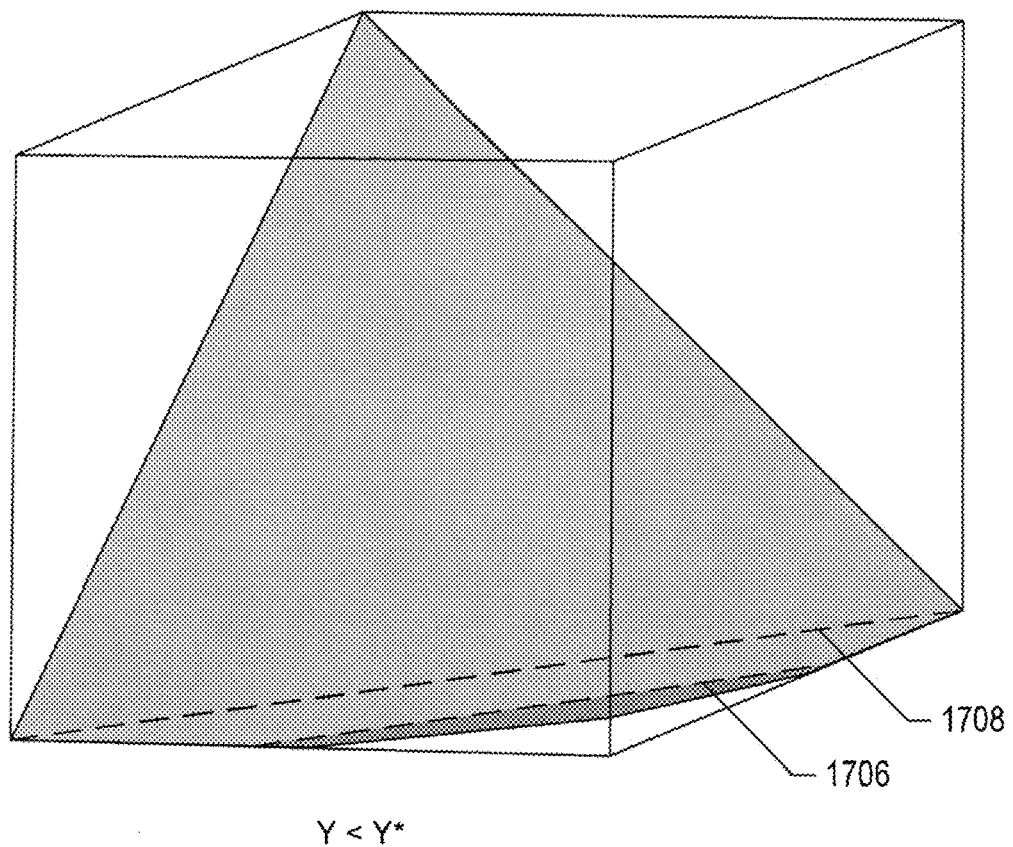
Figure 17C:
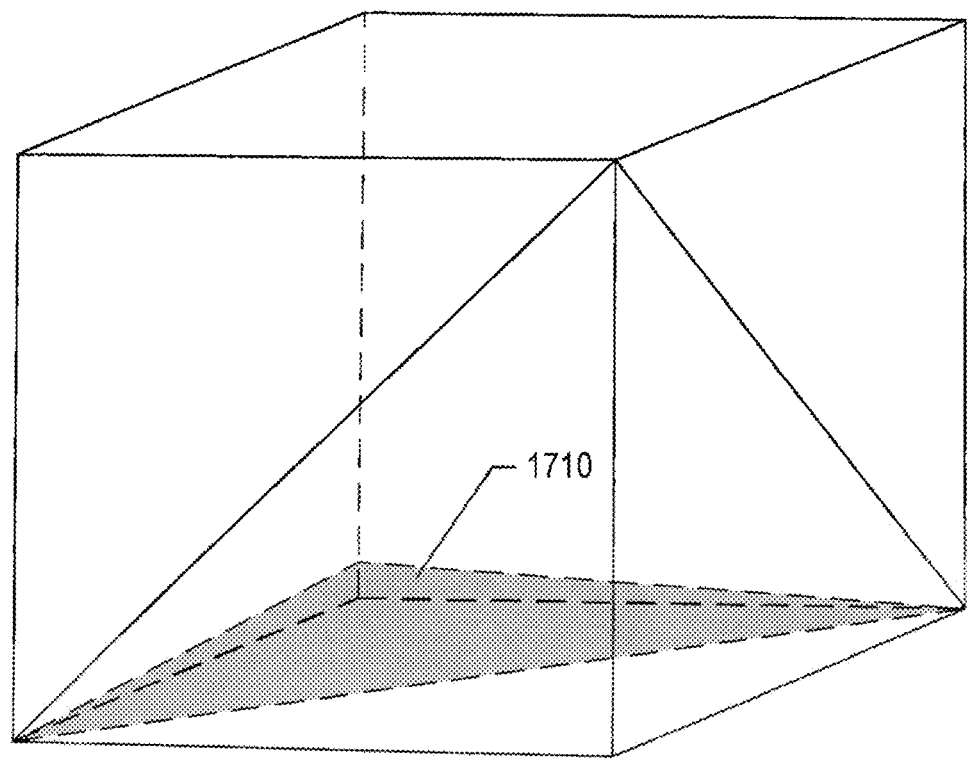

FIGS. 17A-B illustrate alterations of the distance-based loss function that attempt to incorporate additional information provided for suspect labels in an augmented training dataset. FIGS. 17A-B illustrates alterations to the distance-based loss function in the case that the additional information represents the fact that the ideal-label value y is less than the label value y* initially included in an input-vector/label pair of a training dataset. In this case, as can be seen by comparing the three-dimensional plot of a portion of the surface of the altered distance-based loss function shown in FIG. 17A to the standard distance-based loss function plotted in FIG. 15B, the angle made by the forward-inclined portion of the surface of the loss function E 1702 relative to the horizontal plane 1704 has been greatly decreased so that the loss for points in the area under the forward-inclined portion of the surface of the loss function is decreased significantly with respect to the loss for such points provided by the standard distance-based loss function plotted in FIG. 15B. In other words, since it is known that the ideal label value is less than the initial label value in the input-vector/label pair, the loss function can be altered so that the loss for cases in which the output vector from the neural network is greater than the initial label value, which is known to be greater than the ideal label value, should be low since the output vector has the expected value relative to the ideal label value. In fact, as shown in FIG. 17B, the distance-based loss function may be further altered by moving the line of intersection of the forward-inclined portion of the surface of the loss function with the horizontal plane forward 1706 from the ŷ=y diagonal line 1708 so that a significant portion of the loss function corresponding to points in the horizontal plane for which y<y* has an altered distance-based loss function value of 0. As shown in FIG. 17C, when the additional information indicates that the initial label value is less than the ideal label value, the distance-based loss function is altered so that the backward-inclined surface of the distance-based loss function 1710 is inclined at a much lower angle relative to the horizontal plane in the standard distance-based loss function, a three-dimensional plot of which is shown in FIG. 15C.

There are, of course, many different possible parameter-based alterations of the standard loss function that can be considered in order to produce a loss function reflective of the additional information supplied for suspect labels. As discussed above, the angles of inclination of the two dihedral surfaces of the loss function with respect to the horizontal plane may be altered, the line representing the intersection of the two dihedral plane surfaces of the loss function may be translated and may also be rotated. In additional alterations, the dihedral planes may be further partitioned into sub-planes, such as in the altered loss function shown in FIG. 17B. The squared-distance-based loss function shown in FIG. 16, normally used for determining the loss during neural-network training, may be similarly altered by altering the curvatures of the sides of the parabolic-trough error surface, changing the position and orientation of the line within the surface coincident with the horizontal plane, and by other such alterations to the form of the squared-distance-based-loss-function surface.

FIG. 18 illustrates one parametric loss function that can be employed by the currently disclosed methods and systems to generate loss-class-specific loss values for training-dataset input-vector/label pairs with suspect labels. This loss function is referred to as a "boundary-loss function," and can be mathematically expressed by the set of equations 1802 provided in FIG. 18. The parameter p essentially asymmetrically alters the curvatures of the sides of the trough-like surface of the loss function to produce altered surfaces in similar fashion to the altered surfaces of the distance-based loss function illustrated in FIGS. 17A and 17C. The parameter k alters the position and orientation of the single line on the surface of the loss function coincident with the horizontal plane. Values of the parameter p may continuously range from 1 to 2. The values of the parameter p corresponding to the non-OK additional-information values discussed above with reference to FIG. 14C are shown in the lower part 1804 of FIG. 18. For those labels that are associated with OK additional-information values, the standard loss function may be used.

Figure 19A:
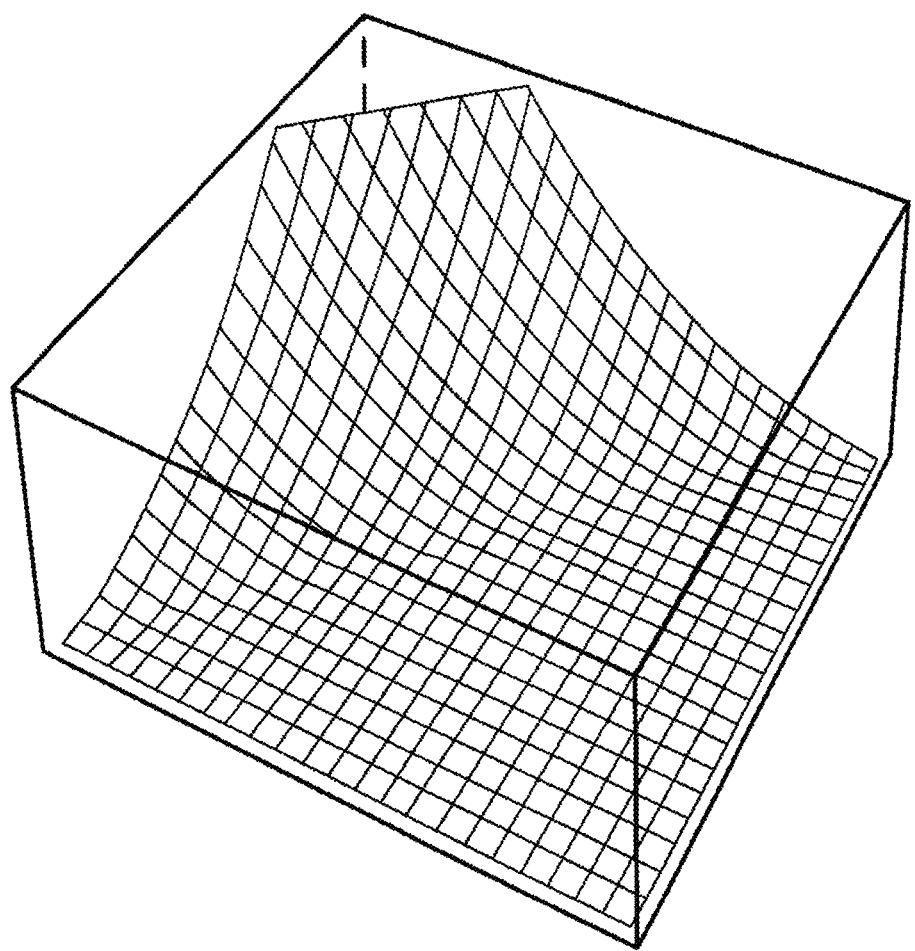
FIGS. 19A-G show three-dimensional plots of portions of the surface of the boundary-loss function for different values of the parameters p and k.
Figure 19B:
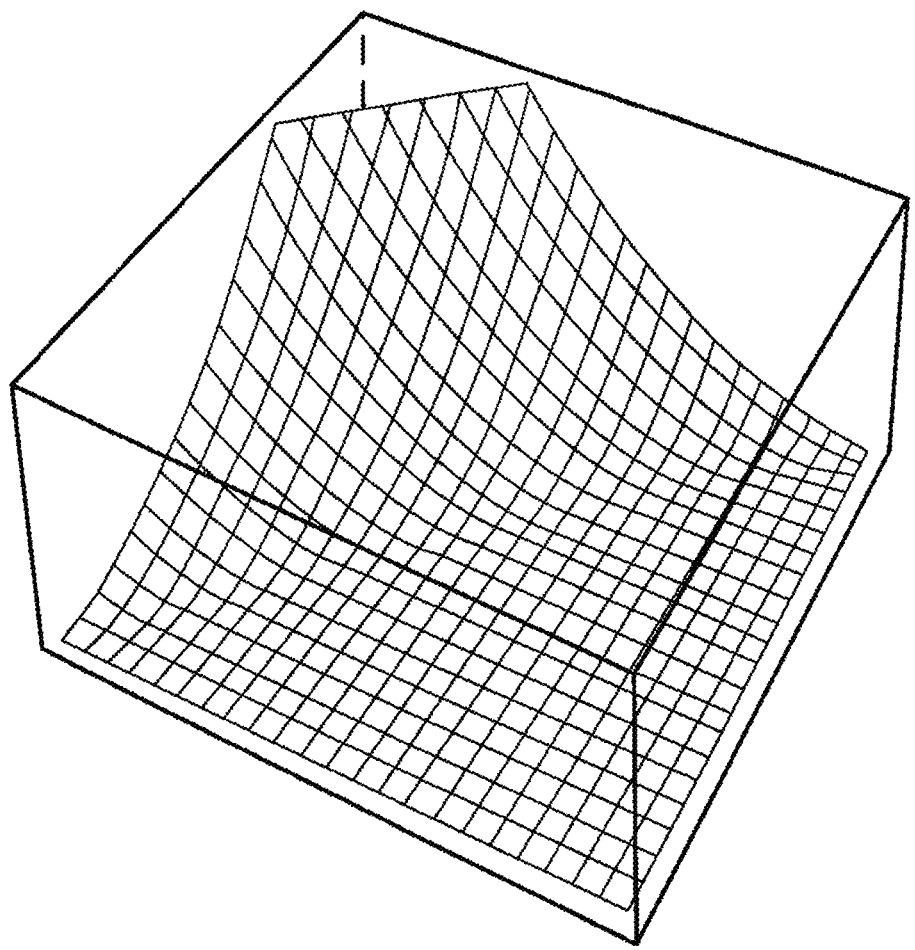
Figure 19C:
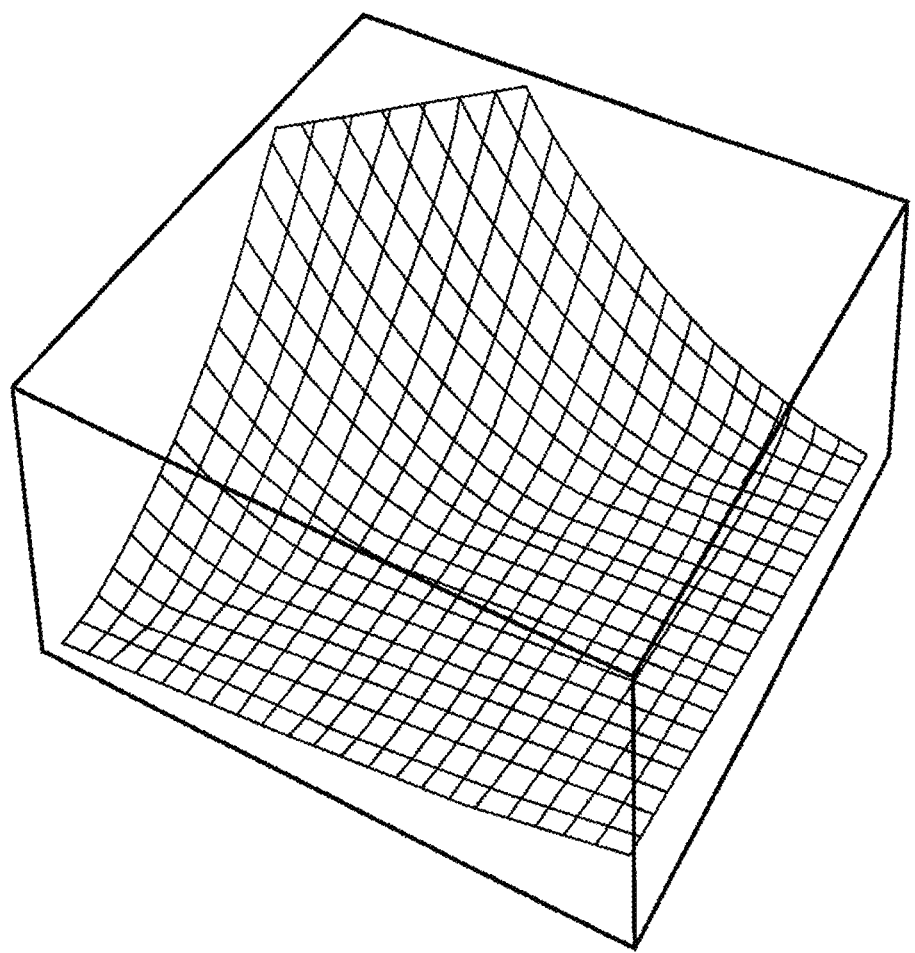
Figure 19D:
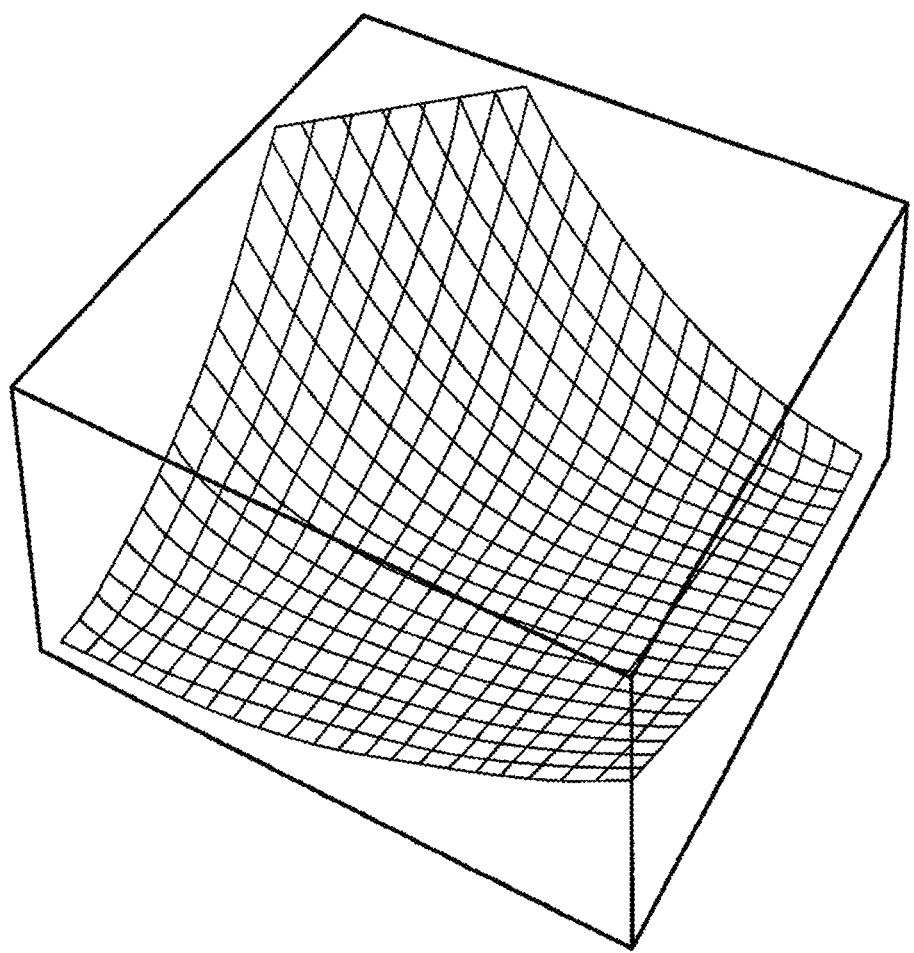
Figure 19E:
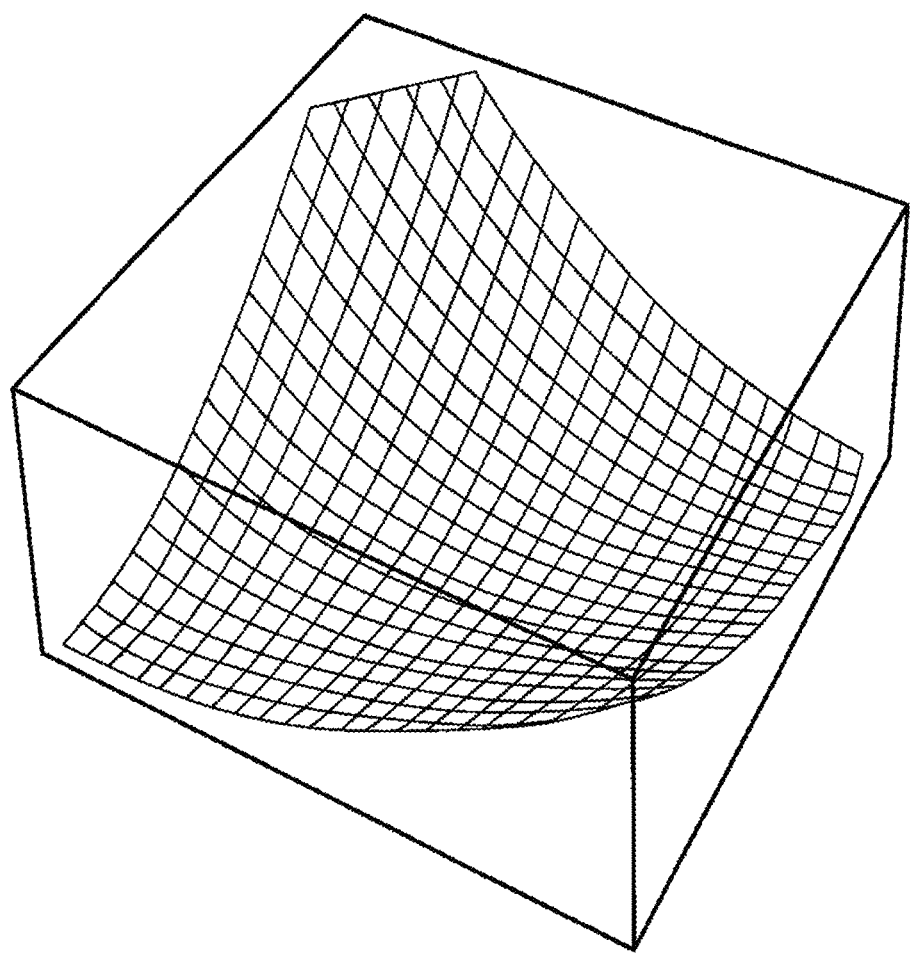
Figure 19F:
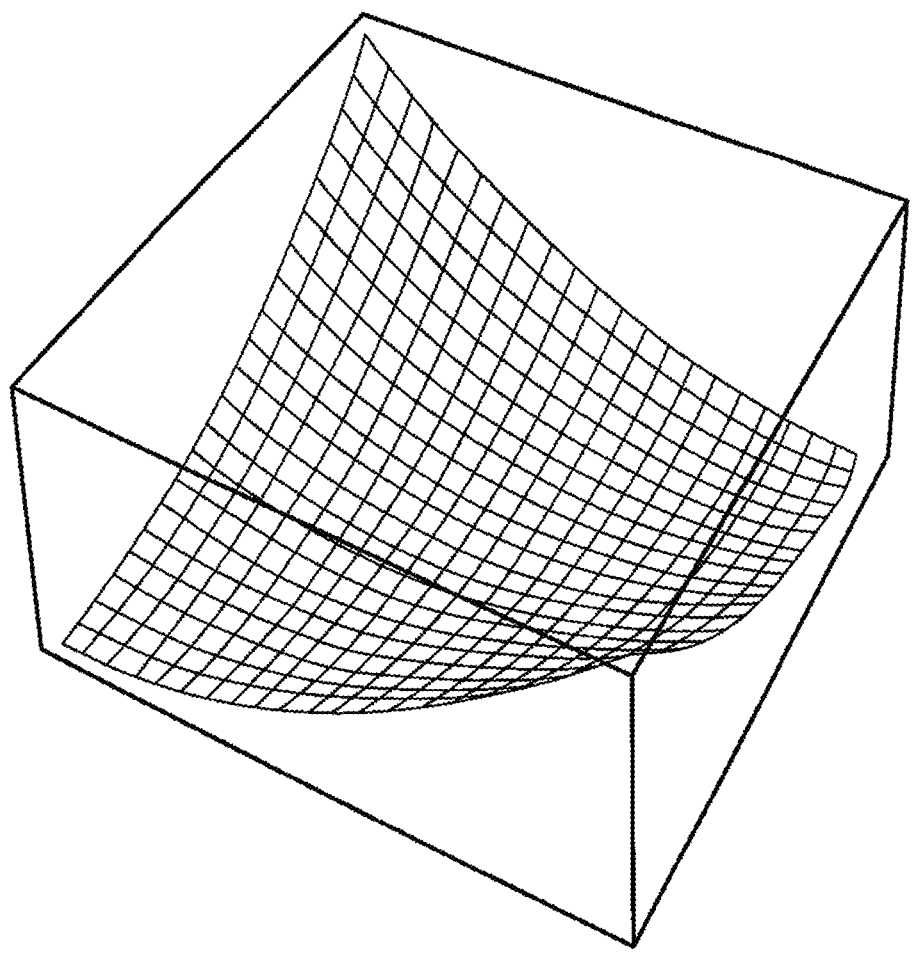
Figure 19G:
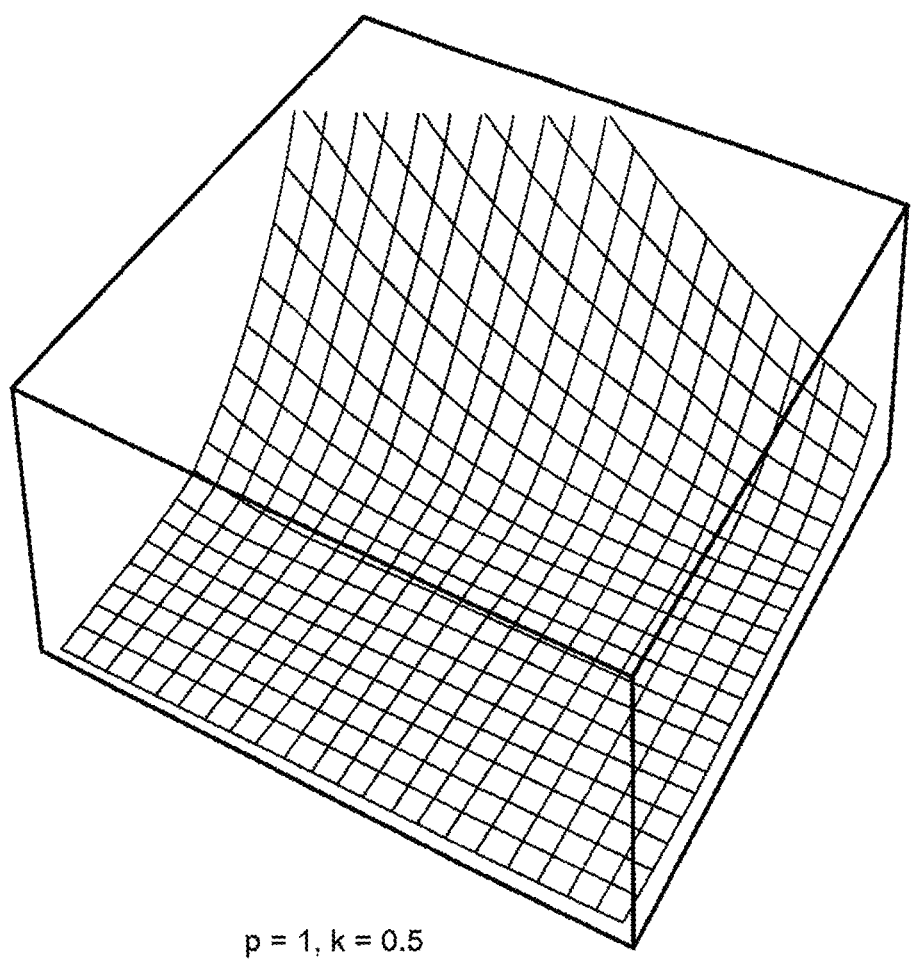

FIGS. 19A-G show three-dimensional plots of portions of the surface of the boundary-loss function for different values of the parameters p and k. The plotted surface of the boundary-loss function has a form reminiscent of the plotted surface of the altered distance-based loss function shown in FIG. 17A. As the value of the parameter p increases through the series of figures, in FIGS. 19 B-E, the form of the plotted surface of the boundary-loss function approaches that of the squared-distance loss function plotted in FIG. 16. Further increasing the value of the parameter p would begin to lower the curvature of the backward-inclined portion of the sides of the trough-like loss-function surface until, at p=2, the boundary-loss function would have a form reminiscent of the form of the altered distance-loss function shown in FIG. 17C. FIG. 19G shows a change in the position and orientation of the horizontal line coincident with both the surface of the loss function and the horizontal plane when the value of the parameter k is increased from 0 to 0.5.

Although the present invention has been described in terms of particular embodiments, it is not intended that the invention be limited to these embodiments. Modification within the spirit of the invention will be apparent to those skilled in the art. For example, any of a variety of different implementations of the currently disclosed methods and systems can be obtained by varying any of many different design and implementation parameters, including modular organization, programming language, underlying operating system, control structures, data structures, and other such design and implementation parameters. As discussed above, a variety of different types of loss functions can be employed to represent the loss associated with various different loss classes associated with additional information in an augmented training dataset. The additional information with which a data training set is augmented can include many different characterizations of the labels included in the training dataset with respect to corresponding ideal labels.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A machine-learning system comprising:
   one or more computer systems, each including one or more processors and one or more memories;
   machine-learning data structures that include weights that are determined during training of the machine-learning system;
   a machine-learning control program that, when executed on one or more of the one or more processors, receives input data, processes the input data using the machine-learning data structures to produce result data, and generates output data that is stored in one or more of the one or more memories; and
   a training control program that, when executed on one or more of the one or more processors, iteratively
      selects a next portion of an augmented training dataset that includes input/label pairs, each input/label pair comprising an input and a label,
      maps the selected next portion of the augmented training dataset to loss classes, and
      for each loss class,
         inputs the input/label pairs of the next portion of the augmented training dataset, mapped to the loss class, to the machine-learning control program,
         applies a loss-class-specific method, to output data generated by the machine-learning control program and to labels of the input/label pairs of the next portion of the augmented training dataset mapped to the loss class, to generate a loss, and
         back-propagates the loss through the machine-learning data structures to adjust the included weights.

2. The machine-learning system of claim 1 wherein the machine-learning data structures include nodes that are interconnected to form a graph.

3. The machine-learning system of claim 2 wherein each node
   receives input values from one or more input-value sources;
   computes an aggregate input value using the input values and weights corresponding to the one or more input-value sources; and
   generates an output value that the node outputs to an output-value sink.

4. The machine-learning system of claim 3
   wherein input-value sources include one or more of
      other machine-learning-data-structure nodes, and
      the machine-learning control program; and
   wherein output-value sinks include
      other machine-learning-data-structure nodes, and
      the machine-learning control program.

5. The machine-learning system of claim 1
   wherein the next portion of the augmented training dataset includes one or more input/label pairs; and
   wherein each of the one or more input/label pairs may be associated with additional information.

6. The machine-learning system of claim 5
   wherein each loss class corresponds to a subset of the additional information associated with the one or more input/label pairs; and
   wherein each subset of the additional information corresponding to one of the loss classes is unique.

7. The machine-learning system of claim 6 wherein the training control program applies the loss-class-specific method to the output data generated by the machine-learning control program and to the labels of the input/label pairs of the next portion of the augmented training dataset mapped to the loss class to a generate the loss by:
   generating a metric value from the labels of the input/label pairs of the next portion of the augmented training dataset and the output data generated by the machine-learning control program; and
   applying the loss-class-specific method to the metric value, the loss-class-specific method considering additional information corresponding to the loss class to generate the loss.

8. The machine-learning system of claim 7 wherein the metric value is one of:
   a distance measure reflective of a distance between a label of one input/label pair and the output data generated by the machine-learning control program by processing an input of the one input/label pair; and
   an aggregate distance measure reflective of multiple distances, each of the multiple distances being a distance between a label of a different one of the input/label pairs and output data generated by the machine-learning control program by processing an input of the different one of the input/label pairs.

9. The machine-learning system of claim 8
   wherein the output data, generated by the machine-learning control program by processing the input of the one input/label pair or by processing an input of one of the input/label pairs, is a vector of values,
   wherein the label of the one input/label pair or each of the labels of the input/label pairs is a vector of values, wherein output-data vectors of values and label vectors of values have a common dimension d; and wherein the distance of which the distance measure is reflective is one of a spatial distance, in a space of the common dimension d, between a point corresponding to an output-data vector of values and one of a point corresponding to the label vector of values of the one input/label pair or a volume corresponding to the label vector of values of the one input/label pair, and an aggregate spatial distance, in a space of the common dimension d, determined from the multiple distances, each of the multiple distances being a distance between a point corresponding to an output-data vector of values and a point corresponding to the label vector of values or a volume corresponding to the label vector of values.

10. The machine-learning system of claim 9 wherein the distance measure is proportional to one of:

the aggregate spatial distance;
a square of the aggregate spatial distance;
the aggregate spatial distance raised to a real-number power;
the spatial distance;
a square of the spatial distance; and
the spatial distance raised to a real-number power.

11. A method that trains a machine-learning component of a system that includes one or more computer systems, each including one or more processors and one or more memories, machine-learning data structures that include weights that are determined during training of the machine-learning component, and a machine-learning control program that, when executed on one or more of the one or more processors, receives input data, processes the input data using the machine-learning data structures to produce result data, and generates output data that is stored in one or more of the one or more memories, the method comprising:

receiving a training dataset comprising input/label pairs, each input/label pair comprising an input and a label;
receiving additional information for one or more of the input/label pairs;
augmenting the training dataset by, for each input/label pair of the one or more of the input/label pairs, associating additional information for the input/label pair with the input/label pair; and
iteratively
selecting a next portion of the augmented training dataset,
mapping the selected next portion of the augmented training dataset to loss classes, and
for each loss class,
inputting input/label pairs of the next portion of the augmented training dataset mapped to the loss class to the machine-learning control program,
applying a loss-class-specific method, to output data generated by the machine-learning control program and to labels of the input/label pairs of the next portion of the augmented training dataset mapped to the loss class, to generate a loss, and
back-propagating the loss through the machine-learning data structures to adjust the included weights.

12. The method of claim 11 wherein the machine-learning data structures include nodes that are interconnected to form a graph; and wherein each node receives input values from one or more input-value sources;
computes an aggregate input value using the input values and weights corresponding to the one or more input-value sources; and
generates an output value that the node outputs to an output-value sink.

13. The method of claim 12 wherein input-value sources include one or more of other machine-learning-data-structure nodes, and
the machine-learning control program; and wherein output-value sinks include other machine-learning-data-structure nodes, and
the machine-learning control program.

14. The method of claim 11 wherein each of the input/label pairs of the next portion of the augmented training dataset may be associated with additional information.

15. The method of claim 14 wherein each loss class corresponds to a subset of the additional information for the one or more of the input/label pairs; and
wherein each subset of the additional information corresponding to one of the loss classes is unique.

16. The method of claim 15 wherein a training control program applies the loss-class-specific method to the output data generated by the machine-learning control program and to labels of the input/label pairs of the next portion of the augmented training dataset mapped to the loss class to generate the loss by:

generating a metric value from the labels of the input/label pairs of the next portion of the augmented training dataset and the output data generated by the machine-learning control program; and
applying the loss-class-specific method to the metric value, the loss-class-specific method considering additional information corresponding to the loss class to generate the loss.

17. The method of claim 16 wherein the metric value is one of:

a distance measure reflective of a distance between a label of one input/label pair and the output data generated by the machine-learning control program by processing an input of the one input/label pair; and
an aggregate distance measure reflective of multiple distances, each of the multiple distances being a distance between a label of a different one of the input/label pairs and output data generated by the machine-learning control program by processing an input of the different one of the input/label pairs.

18. The method of claim 17 wherein the output data, generated by the machine-learning control program by processing the input of the one input/label pair or by processing an input of one of the input/label pairs, is a vector of values,
wherein the label of the one input/label pair or each of the labels of the input/label pairs is a vector of values,
wherein output-data vectors of values and label vectors of values have a common dimension d; and
wherein the distance of which the distance measure is reflective is one of
a spatial distance, in a space of the common dimension d, between a point corresponding to an output-data vector of values and one of a point corresponding to the label vector of values of the one input/label pair or a volume corresponding to the label vector of values of the one input/label pair, and an aggregate spatial distance, in a space of the common dimension d, determined from the multiple distances, each of the multiple distances being a distance between a point corresponding to an output-data vector of values and a point corresponding to the label vector of values or a volume corresponding to the label vector of values.

19. The method of claim 18 wherein the distance measure is proportional to one of:
the aggregate spatial distance;
a square of the aggregate spatial distance;
the aggregate spatial distance raised to a real-number power;
the spatial distance;
a square of the spatial distance; and
the spatial distance raised to a real-number power.

20. A physical data-storage device encoded with computer instructions that, when executed on one or more processors of one or more computer systems that comprise a system that includes a machine-learning component, machine-learning data structures that include weights that are determined during training of the machine-learning component, and a machine-learning control program that receives input data, processes the input data using the machine-learning data structures to produce result data, and generates output data that is stored in one or more memories, controls the one or more computer systems to:

receive a training dataset comprising input/label pairs, each input/label pair comprising an input and a label;

receive additional information for one or more of the input/label pairs;

augment the training dataset by, for each input/label pair of the one or more of the input/label pairs, associating additional information for the input/label pair with the input/label pair; and iteratively select a next portion of the augmented training dataset, mapping the selected next portion of the augmented training dataset into loss classes, and for each loss class, input input/label pairs of the next portion of the augmented training dataset mapped to the loss class to the machine-learning control program, apply a loss-class-specific method, to output data generated by the machine-learning control program and to labels of the input/label pairs of the next portion of the augmented training dataset mapped to the loss class, to generate a loss, and back-propagate the loss through the machine-learning data structures to adjust the included weights.

\* \* \* \* \*